(12) United States Patent
Loui et al.

(10) Patent No.: US 8,028,249 B2
(45) Date of Patent: Sep. 27, 2011

(54) METHOD AND SYSTEM FOR BROWSING LARGE DIGITAL MULTIMEDIA OBJECT COLLECTIONS

(75) Inventors: Alexander C. Loui, Penfield, NY (US); Frank Marino, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 741 days.

(21) Appl. No.: 11/196,991

(22) Filed: Sep. 8, 2005

(65) Prior Publication Data

US 2006/0090141 A1   Apr. 27, 2006

Related U.S. Application Data

(63) Continuation-in-part of application No. 09/863,856, filed on May 23, 2001, now Pat. No. 6,996,782.

(51) Int. Cl.
G06F 3/048 (2006.01)
G06F 3/14 (2006.01)

(52) U.S. Cl. ......... 715/835; 715/764; 715/825; 715/864

(58) Field of Classification Search .................. 715/835, 715/764
See application file for complete search history.

(56) References Cited

U.S. PATENT DOCUMENTS

| | | | |
|---|---|---|---|
| 4,396,903 A | 8/1983 | Habicht et al. | |
| 4,567,610 A | 1/1986 | McConnell | |
| 5,083,860 A | 1/1992 | Miyatake et al. | |
| 5,164,831 A | 11/1992 | Kuchta et al. | |
| 5,493,677 A | 2/1996 | Balogh et al. | |
| 5,539,841 A | 7/1996 | Huttenlocher et al. | |
| 5,576,759 A | 11/1996 | Kawamura et al. | |
| 5,594,807 A | 1/1997 | Liu | |
| 5,598,557 A | 1/1997 | Doner et al. | |
| 5,719,643 A | 2/1998 | Nakajima | |
| 5,734,853 A * | 3/1998 | Hendricks et al. | ............ 715/716 |
| 5,748,771 A | 5/1998 | Fujiwara | |

(Continued)

FOREIGN PATENT DOCUMENTS

EP   0 472 806   6/1996

(Continued)

OTHER PUBLICATIONS

John E. Freund et al., "Dictionary/Outline of Basic Statistics", 1991, pp. 49-50, Dover Publications, Inc.

(Continued)

*Primary Examiner* — Chat Do
*Assistant Examiner* — Stephen Alvesteffer
(74) *Attorney, Agent, or Firm* — Roland R. Schindler; Christopher J. White

(57) ABSTRACT

A display system and method for operating a display and a collection of digital multimedia objects are provided. A first selection set of predefined organizational metaphors is presented and a selection of a first organizational metaphor from the first selection set is received. A second selection set of predefined organizational metaphors other than the first selected organizational metaphor is presented and a selection of a second organizational metaphor from the second selection set is received. A result is presented on the display having one of at least two group icons, each group icon indicating a group of digital multimedia objects chosen from the collection according to rules associated with the selected organizational metaphors and the content of the digital multimedia objects or any metadata associated with the digital multimedia objects. Wherein the group of digital multimedia objects indicated by each group icon are chosen according to result presentation rules.

20 Claims, 27 Drawing Sheets

U.S. PATENT DOCUMENTS

| | | | |
|---|---|---|---|
| 5,751,378 A | 5/1998 | Chen et al. | |
| 5,805,746 A | 9/1998 | Miyatake et al. | |
| 5,809,161 A | 9/1998 | Auty et al. | |
| 5,809,202 A | 9/1998 | Gotoh et al. | |
| 5,842,194 A | 11/1998 | Arbuckle | |
| 5,872,859 A | 2/1999 | Gur et al. | |
| 5,982,369 A | 11/1999 | Sciammarella et al. | |
| 6,012,091 A | 1/2000 | Boyce | |
| 6,021,231 A | 2/2000 | Miyatake et al. | |
| 6,097,389 A | 8/2000 | Morris et al. | |
| 6,204,840 B1 | 3/2001 | Petelycky et al. | |
| 6,301,586 B1 | 10/2001 | Yang et al. | |
| 6,311,189 B1 | 10/2001 | deVries et al. | |
| 6,335,742 B1 | 1/2002 | Takemoto | |
| 6,351,556 B1 | 2/2002 | Loui et al. | |
| 6,396,963 B2 | 5/2002 | Shaffer et al. | |
| 6,408,301 B1 | 6/2002 | Patton et al. | |
| 6,469,719 B1* | 10/2002 | Kino et al. | 715/810 |
| 6,486,896 B1 | 11/2002 | Ubillos | |
| 6,486,898 B1 | 11/2002 | Martino et al. | |
| 6,545,660 B1 | 4/2003 | Shen et al. | |
| 6,564,209 B1 | 5/2003 | Dempski et al. | |
| 6,567,980 B1 | 5/2003 | Jain et al. | |
| 6,606,411 B1 | 8/2003 | Loui et al. | |
| 6,784,925 B1 | 8/2004 | Tomat et al. | |
| 6,865,297 B2 | 3/2005 | Loui et al. | |
| 6,961,731 B2* | 11/2005 | Holbrook | 1/1 |
| 7,131,059 B2* | 10/2006 | Obrador | 715/209 |
| 7,334,195 B2* | 2/2008 | Gemmell et al. | 715/841 |
| 2001/0030667 A1 | 10/2001 | Kelts | |
| 2001/0033302 A1* | 10/2001 | Lloyd-Jones et al. | 345/853 |
| 2002/0055955 A1* | 5/2002 | Lloyd-Jones et al. | 707/512 |
| 2002/0075322 A1 | 6/2002 | Rosenzweig et al. | |
| 2002/0078035 A1* | 6/2002 | Frank et al. | 707/3 |
| 2002/0140820 A1 | 10/2002 | Borden, IV | |
| 2002/0184111 A1* | 12/2002 | Swanson | 705/26 |
| 2003/0009493 A1 | 1/2003 | Parker et al. | |
| 2003/0046150 A1* | 3/2003 | Ader et al. | 705/14 |
| 2003/0080977 A1 | 5/2003 | Scott et al. | |
| 2004/0135815 A1* | 7/2004 | Browne et al. | 345/810 |
| 2005/0166156 A1* | 7/2005 | Frigon et al. | 715/764 |
| 2006/0156259 A1* | 7/2006 | Wagner et al. | 715/963 |
| 2006/0242554 A1* | 10/2006 | Gerace et al. | 715/501.1 |
| 2007/0234196 A1* | 10/2007 | Nicol et al. | 715/501.1 |

FOREIGN PATENT DOCUMENTS

| | | |
|---|---|---|
| EP | 1 148 412 | 10/2001 |
| WO | WO 2004/049206 | 6/2004 |

OTHER PUBLICATIONS

Merriam-Webster Inc., "Webster's Ninth New Collegiate Dictionary", 1990, pp. 573.

Bhavan Gandhi et al., "Intelligent Multimedia Content Management on Mobile Devices", 0-7803-8603-5/04, 2004 IEEE.

* cited by examiner

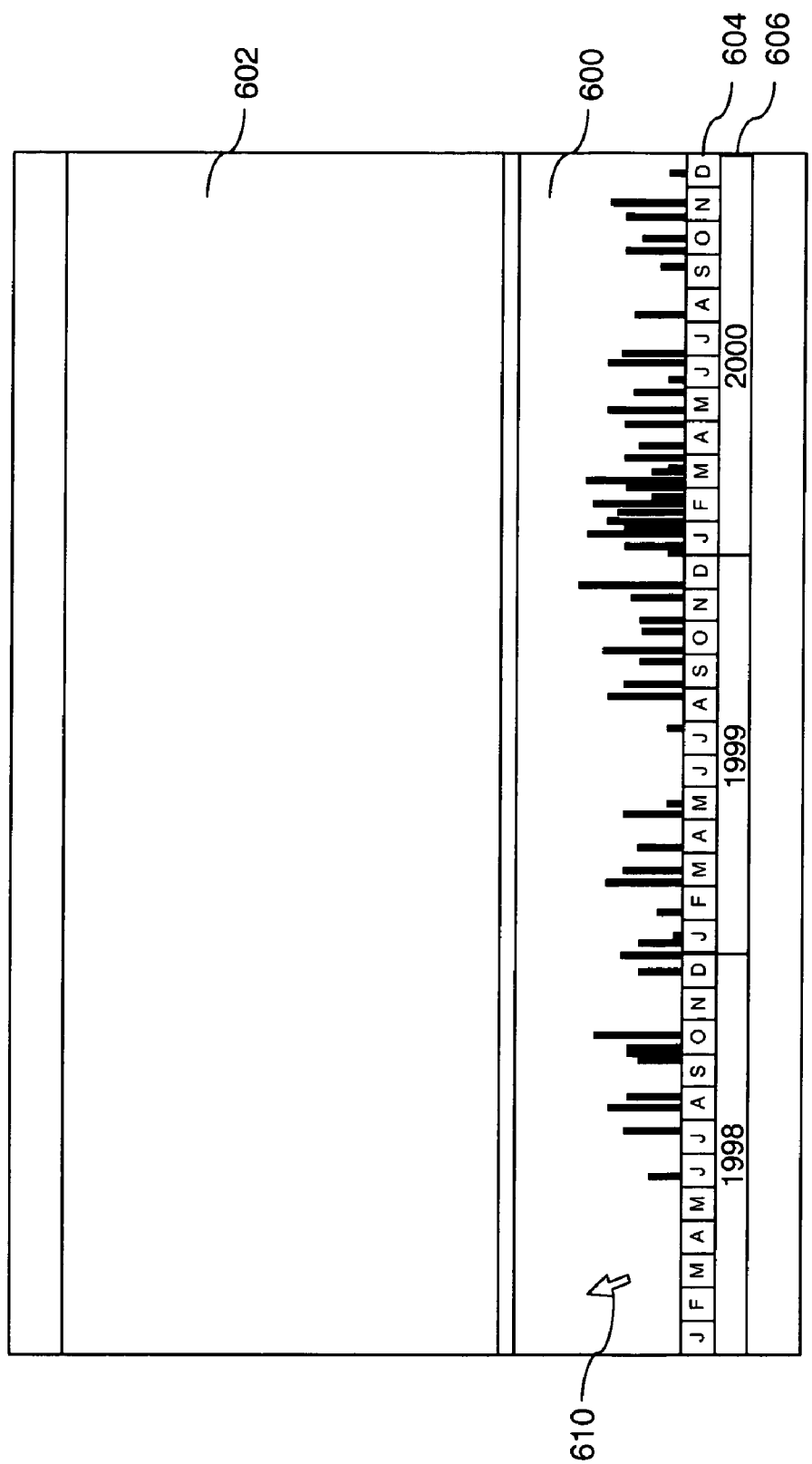

METHOD AND SYSTEM FOR BROWSING LARGE DIGITAL MULTIMEDIA OBJECT COLLECTIONS

CROSS REFERENCE TO RELATED APPLICATIONS

This is a continuation-in-part of application Ser. No. 09/863,856, filed May 23, 2001 now U.S. Pat. No. 6,996,782 entitled USING DIGITAL OBJECTS ORGANIZED ACCORDING TO A HISTOGRAM TIMELINE by Parker et al.

FIELD OF THE INVENTION

The present invention relates to an effective method of organizing digital objects and for facilitating the display or processing of desired objects.

BACKGROUND OF THE INVENTION

Digital imaging devices are being used with increasing frequency to record digital still images and digital audio/video sequences. Digital multimedia content from other sources is also proliferating, such as digitized consumer snapshots, digitized home video, digitally scanned graphics, digitized music, and other audio recording. With the potential for vast numbers of such multimedia objects to be generated and stored by individuals, the problem of representing a collection of such objects to a user for retrieval and organization becomes important. Typically, a digital camera user takes a plurality of digital images or audio/video sequences that are stored on a removable memory card. These multimedia objects can be transferred from the memory card and stored, for example, on a hard drive or other non-volatile memory associated with the user's computer. Alternatively, digital multimedia objects can be transferred over the Internet to a web site for storage, sharing, printing, and other purposes.

Over time, a user can collect hundreds, or perhaps thousands, of multimedia objects, which are records of events at various points in time. As the number of such objects in a particular database grows, traditional methods of displaying them to a user such as in hierarchical file structures or simple "contact sheets" of image thumbnails become ineffective. These digital multimedia objects can be digital still images, digital audio files, digital video segments, graphics files, or related multimedia data and combinations thereof.

SUMMARY OF THE INVENTION

In one aspect of the invention, a method for operating a display associated with a user interface and a collection of digital multimedia objects. A first selection set of predefined organizational metaphors is presented and a selection of a first organizational metaphor from the first selection set of predefined organizational metaphors is received. A second selection set of predefined organizational metaphors other than the first selected organizational metaphor is presented and a selection of a second organizational metaphor from the second selection set of predefined organizational metaphors is received. A result is presented on the display having one of at least two group icons, each group icon indicating a group of digital multimedia objects chosen from the collection according to rules associated with the selected organizational metaphors and the content of the digital multimedia objects or any metadata associated with the digital multimedia objects. Wherein the group of digital multimedia objects indicated by each group icon are chosen according to result presentation rules.

ADVANTAGES

It is an advantage of the invention that digital multimedia objects can be organized in part automatically to facilitate rapid searching using even small displays. It is also an advantage of certain aspects of the present invention that the generation of an event histogram timeline facilitates the representation of a collection of digital multimedia objects to a user and to facilitate the interaction and selection of the digital multimedia objects.

BRIEF DESCRIPTION OF THE DRAWINGS

FIG. 6A is a depiction of a histogram timeline on a display screen in an initial state;

DETAILED DESCRIPTION OF THE INVENTION

The present invention provides an effective method of representing a collection of multimedia or single media objects to a user and to facilitating the interaction with and selection of such objects. These objects are typically visual digital objects such as, for example, still image files, MPEG-1 motion sequences with sound, or digital audio objects such as "WAV" files that can be collected by a user and distributed over a variety of media and storage locations.

The entire collection of these objects, or even some subset, can be so large as to make searching, annotating, processing, or viewing difficult.

With the notable exception of recorded music, the majority of these objects are, to the user, strongly associated with a date or event. This date is typically, though not necessarily, the date of the origination of the object data, as is the case with personal memories such as still images, sound recordings, and home video sequences.

Since each of these objects is typically associated with a date, it is natural to organize them according to dates. A timeline is a well-known method for showing events in chronological order, and representations of objects, such as thumbnail images, can be arranged on a timeline for display. However, in large collections more than one object can be associated with a particular date, and the collection can cover a long time span. In such cases, it is impractical to arrange thumbnails of all objects along the timeline. In accordance with the present invention, a more effective representation is to build a histogram timeline in which the number of objects associated with each date, or time interval, are represented in a graphical form such as a bar chart. More particularly, as will be seen, the histogram timeline represents visual digital objects organized according to predetermined time periods. Thereafter, thumbnail representations are produced after a selection from the histogram timeline.

Figure 1:
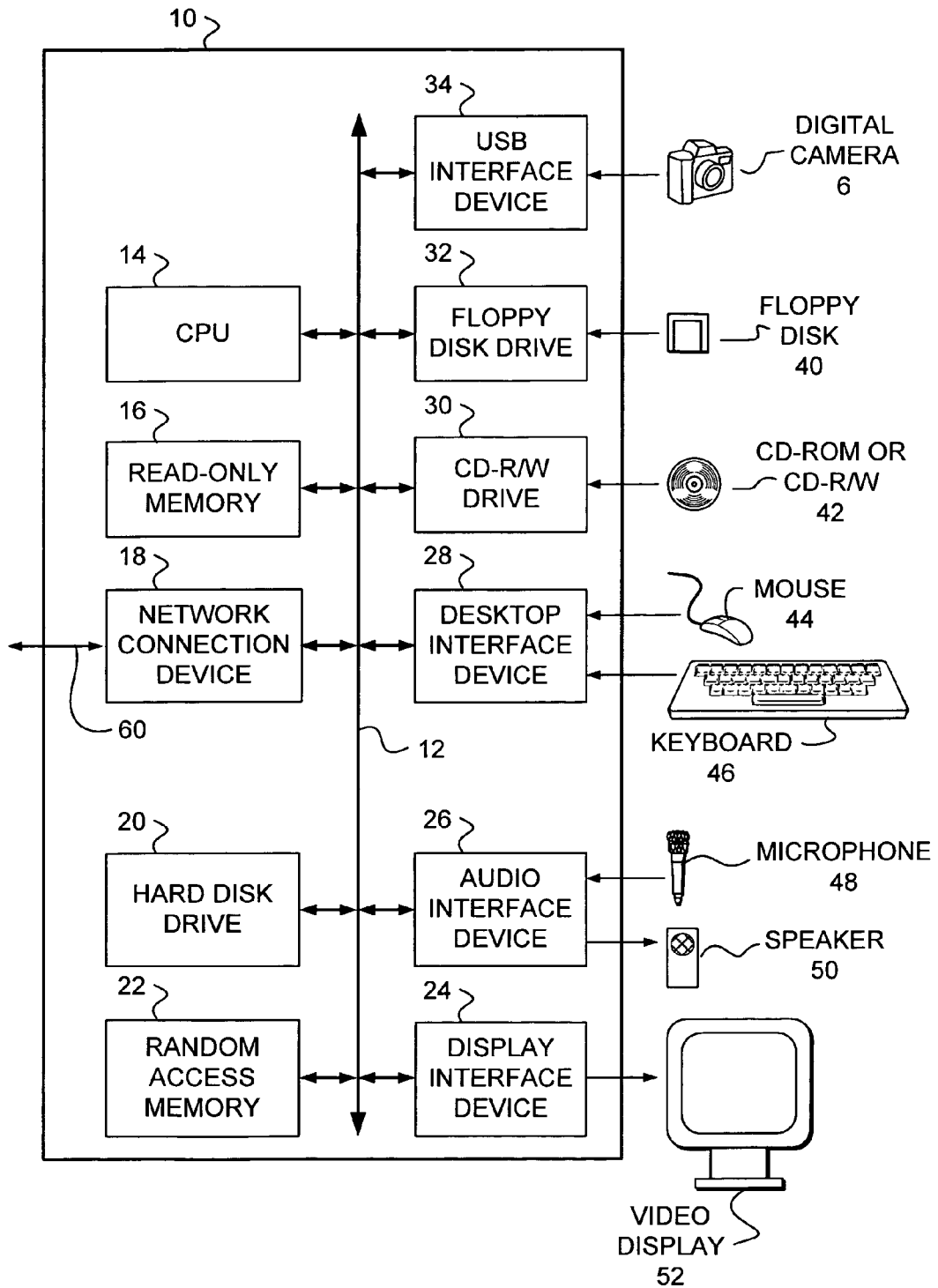
FIG. 1 is a block diagram of a system for practicing the present invention.

As shown in FIG. 1, a system for practicing the present invention includes a home computer 10, which can be, for example, a Dell Dimension L. The home computer 10 includes a CPU 14, which communicates with other devices over a bus 12. The CPU 14 executes software stored on a hard disk drive 20, for example, the well-known Windows 98 operating system software provided by Microsoft Corp. of Redmond, Wash. A video display device 52 is coupled to the CPU 14 via a display interface device 24. The mouse 44 and keyboard 46 are coupled to the CPU 14 via a desktop interface device 28. The home computer 10 also contains a CD-R/W drive 30 to read various CD media and write to CD-R or CD-RW writable media 42. A floppy disk drive 32 is also included to read from and write to floppy disks 40. An audio interface device 26 connected to bus 12 permits audio data from, for example, a digital sound file stored on hard disk drive 20, to be converted to analog audio signals suitable for speaker 50. The audio interface device 26 also converts analog audio signals from microphone 48 into digital data suitable for storage in, for example, the hard disk drive 20. In addition, the home computer 10 is connected to an external network 60 via a network connection device 18. A digital camera 6 can be connected to the home computer 10 through, for example, the USB interface device 34 to transfer still images, audio/video, and sound files from the camera to the hard disk drive 20 and vice-versa.

A collection of digital multimedia or single-media objects (digital images) can reside exclusively on the hard disk drive 20, compact disk 42, or at a remote storage device such as a web server accessible via the network 60. The collection can be distributed across any or all of these as well.

To represent a collection, all of the digital multimedia objects must be associated together as a database. It will be understood that these digital multimedia objects can be digital still images, such as those produced by digital cameras; audio data, such as digitized music or voice annotation files in the "WAV" or "MP3" audio file format; and digital video segments with or without sound, such as MPEG-1 or MPEG-4 video. Digital multimedia objects also include files produced by graphic software, for example the well-known Visio graphics software product, and files representing text documents, such as those produced by the well-known Microsoft Word product. A database of digital multimedia objects can comprise only one type of object or any combination.

Figure 2:
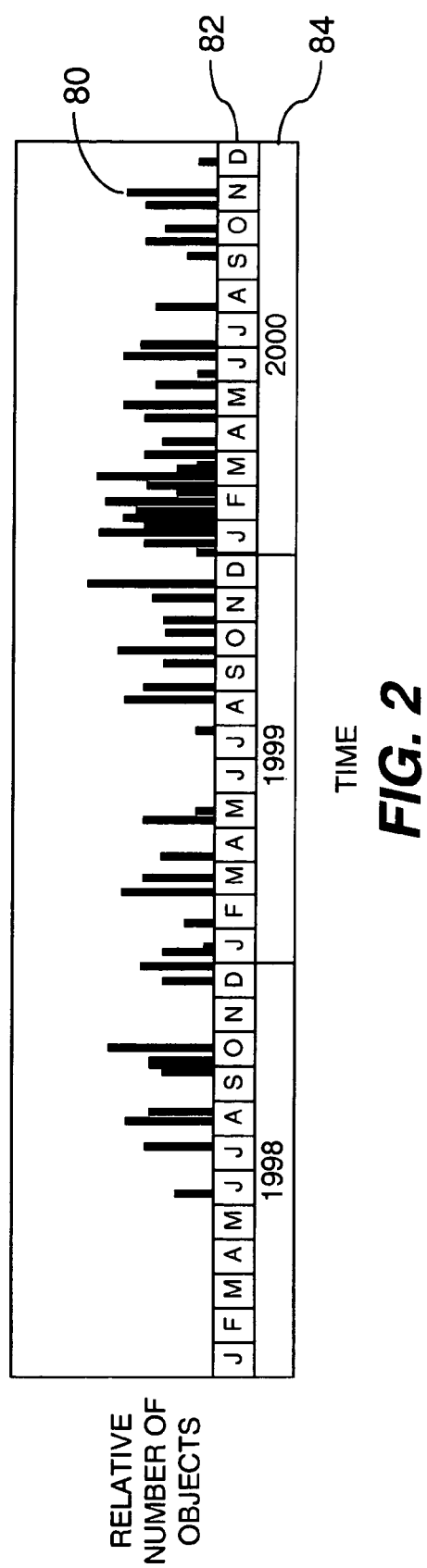
FIG. 2 is a histogram timeline diagram made in accordance with the present invention.

Once a collection of digital multimedia objects are associated together to form a database, they can be represented to the user in accordance with the present invention. FIG. 2 shows an example of a histogram timeline. In this example, the horizontal axis is enumerated in units of time and the vertical axis is enumerated in the number of digital multimedia objects. Alternatively, the vertical axis can be enumerated in the relative number of digital multimedia objects. The length of graphical bar 80 represents the relative number of objects in the chosen database in a given time period on timelines 82 and 84. A time period is the interval of time over which objects associated with a date in that interval are counted together. A time period can have any duration, but would typically be no less than one day. Larger time periods might be constructed if the display area for the histogram was small or the length of the timeline was so large that short time periods could not be displayed adequately. In this example, time scale 82 is composed of month increments and time scale 84 is composed of year increments, though a single time scale is also possible.

Figure 3A:
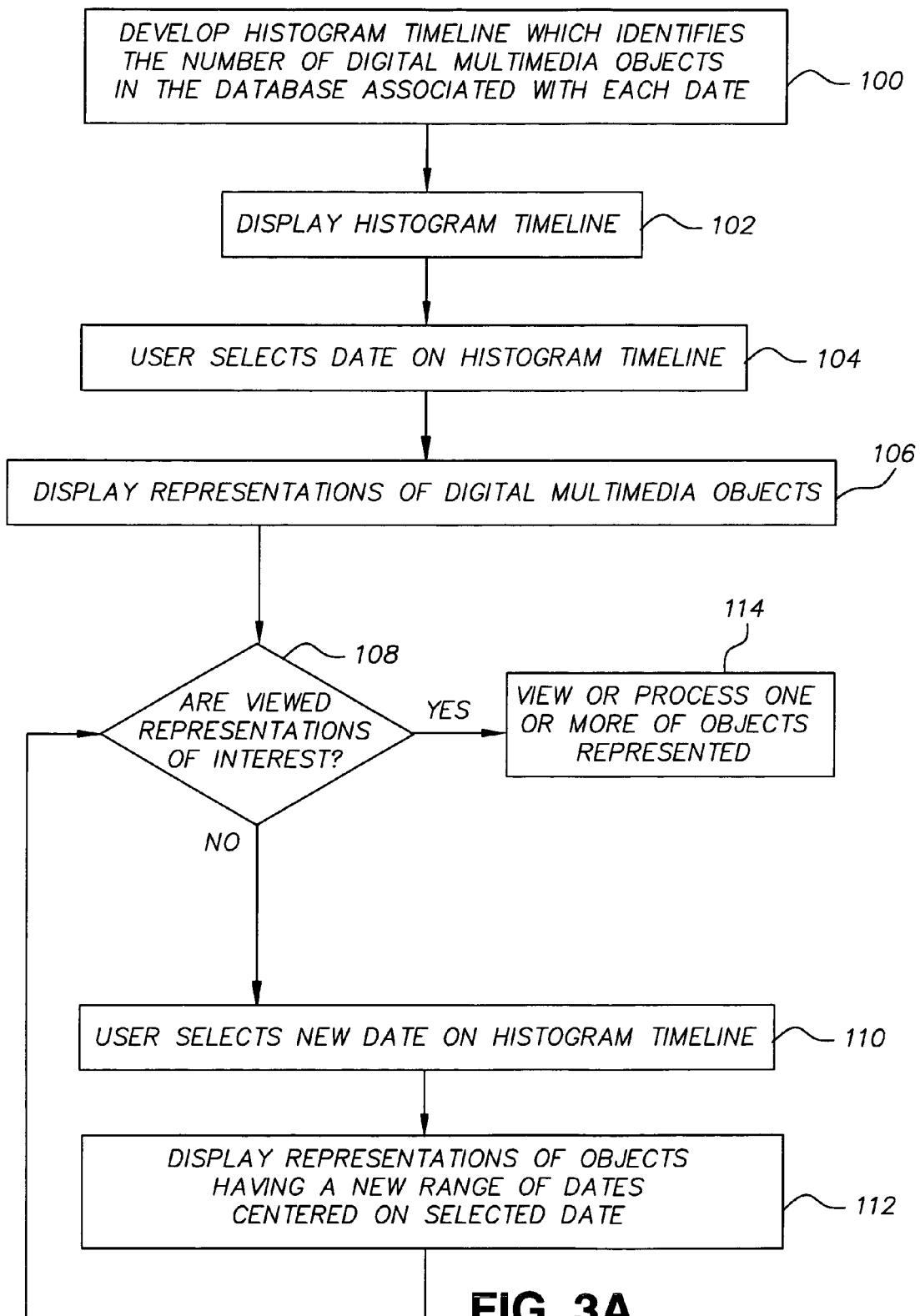
FIG. 3A is a flow diagram showing how a histogram timeline, such as in FIG. 2, can be made and further describing how to select a portion of the histogram timeline for viewing such thumbnail representations of such objects corresponding to such selected portion.

FIG. 3A is a flow diagram that illustrates the generation of the histogram timeline and the interactive steps for practicing the present invention. In step 100, the histogram timeline is formed by counting the number of objects in the database that are associated with each date. The result, internally, is an array of ordered pairs of numbers. One number in the pair represents a given date, and the associated number represents the number of objects associated with the date.

In step 102, the histogram timeline is displayed graphically to the user, as shown in FIG. 6A, with a predetermined range of dates (timeline) based, for example, on the earliest to latest dates associated with all of the objects in the chosen database. Region 600 denotes the area in which the timeline is located, and 604 and 606 are the fine and coarse timeline scales, respectively. Region 602 is a separate viewable area where iconic or thumbnail representations of digital multimedia objects can be displayed to the user. The user may also select one or more of the representations to view, listen to, and/or process. Pointer 610 is a selection device such as a mouse, joystick, or eye movement tracking apparatus.

Figure 6B:
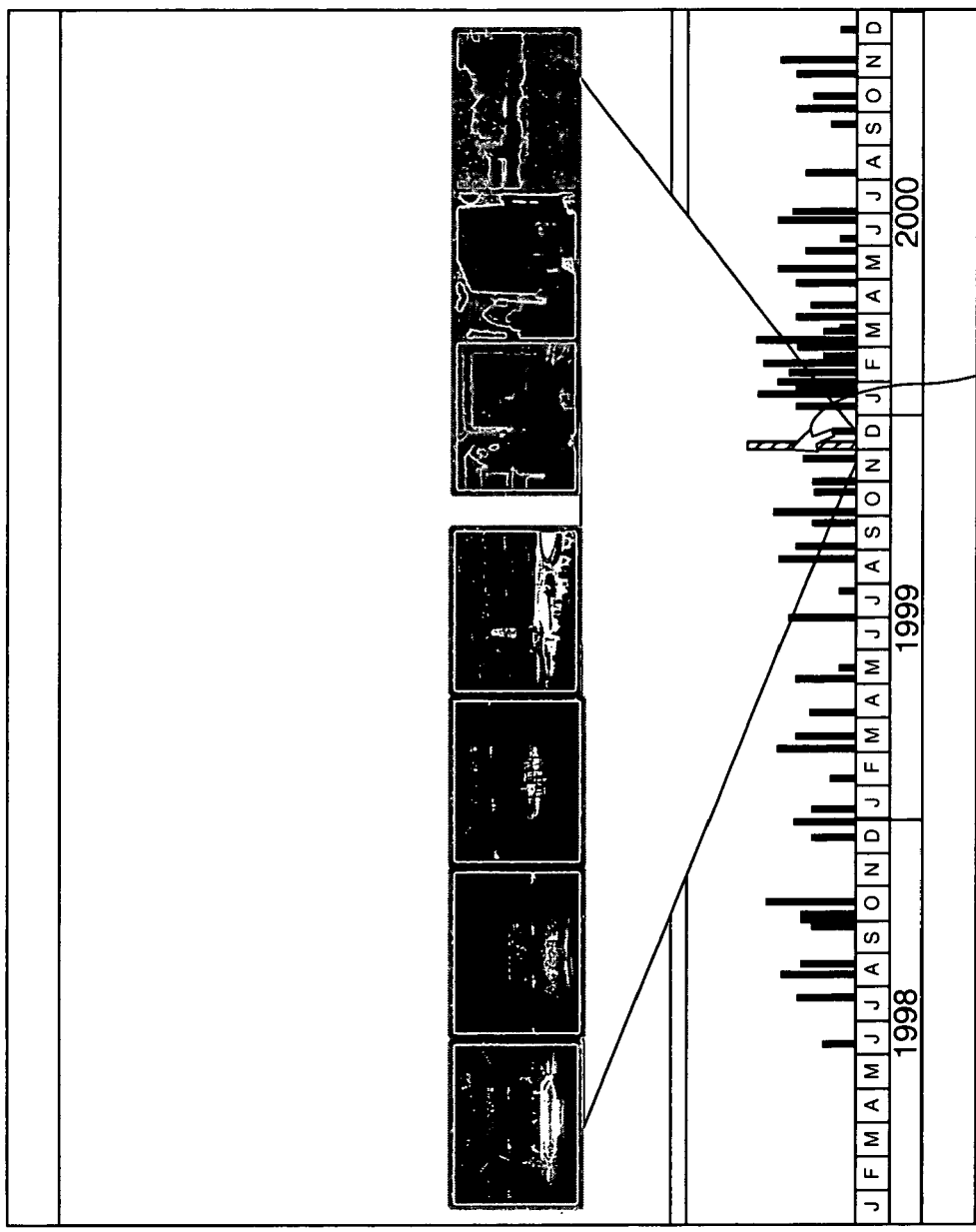
FIG. 6B is a depiction of a histogram timeline and thumbnail representations on a display screen after a portion of the timeline has been selected.

Referring again to FIG. 3A, in step 104 the user selects a date of interest on the histogram timeline. This is depicted in FIG. 6B, where the user selects a date by moving the mouse to move a graphical pointer 610 to a particular histogram bar on the timeline and "clicking" the mouse button. If the time periods were longer than one day, then "clicking" on a histogram bar would select the range of dates included in the time period interval. After selection of the date, thumbnail or iconic representations appear, corresponding to the objects associated with the chosen date, according to step 106 in FIG. 3A. Additionally, the thumbnail and iconic representations displayed, can be grouped according to the events to which they relate, as described in commonly assigned U.S. patent application Ser. No. 09/163,618 filed Sep. 30, 1998, entitled "A Method for Automatically Classifying Images Into Events" by Alexander C. Loui et al., and commonly assigned U.S. patent application Ser. No. 09/197,363 filed Nov. 20, 1998, entitled "A Method for Automatically Comparing Content of Images for Classification Into Events" by Alexander C. Loui et al., the disclosures of which are incorporated herein by reference.

In step 108, the user decides if the representations displayed are of interest. If not, the user can then select a new date on the histogram timeline, as shown in step 110. In step 112, new iconic or thumbnail representations are displayed corresponding to objects associated with the new date. Alternatively, other ways can be used to access thumbnail or iconic representations extending just outside of the range displayed to the user. For example, a scroll bar oriented below the representations could be used to scroll forward and backward in time, with the representations and the timeline changing in response. In the practice of the present invention, it will be understood that "dragging" a thumbnail to a new viewing position can be accomplished by selecting it and then moving the pointer. As the thumbnail is dragged, thumbnail representations in the direction of motion are "pushed" off the screen, and new thumbnail representations are "pulled" into the screen from the opposite side.

Referring again to FIG. 3A, if one or more of the thumbnail representations is of interest, the user can then move on to view or process one of the objects represented as shown in step 114. Processing can entail, for example, invoking an image viewer for viewing an image at a higher resolution, invoking an image editor to edit a still image, invoking an audio player for listening to audio data, or invoking a video player to view a video sequence. Processing can also entail the addition of audio, graphical, and text annotation to an object, transferring objects to another database or collection, or some other function based on the digital multimedia object type and user's desire.

Figure 3B:
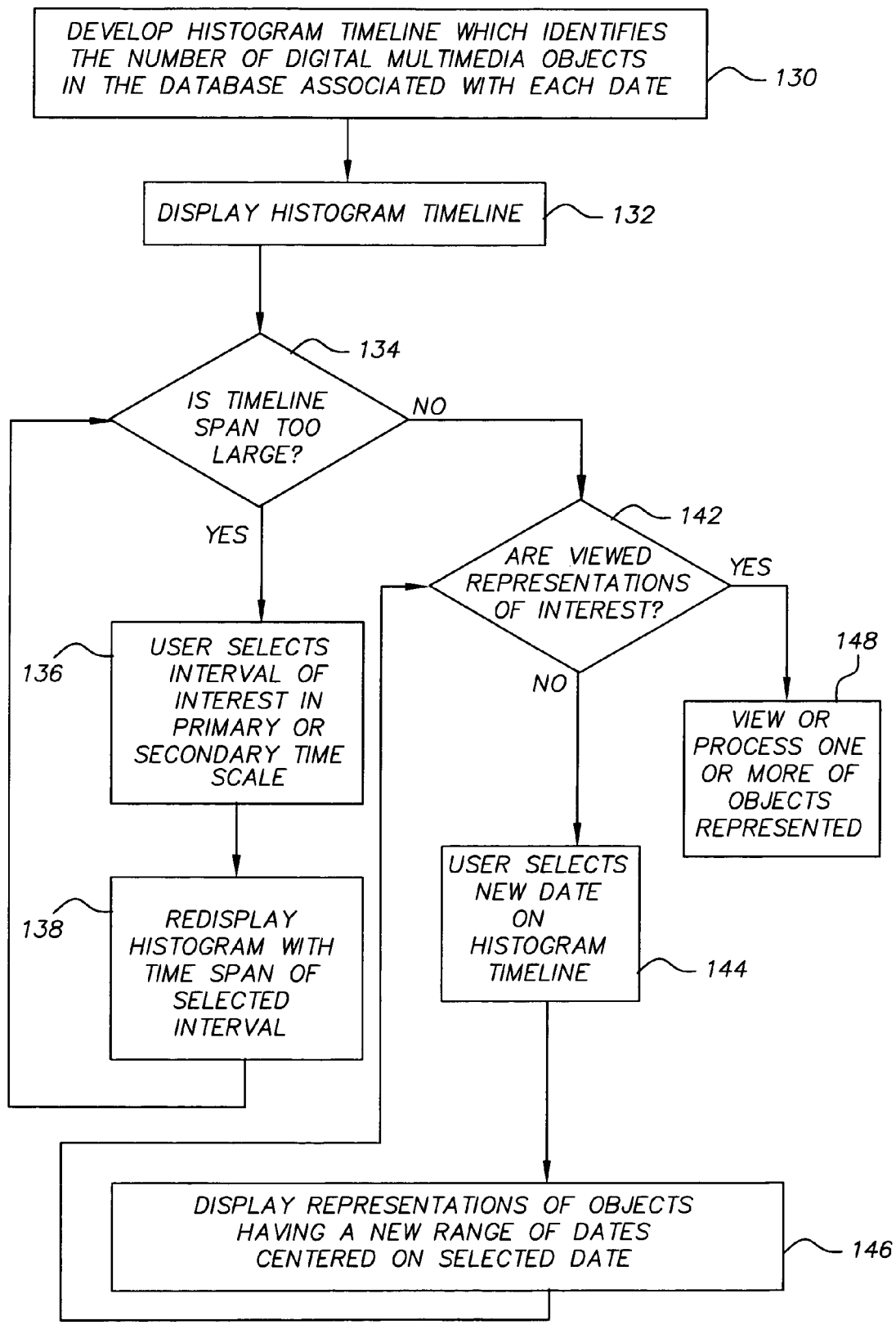
FIG. 3B is a flow diagram showing the determination of the desired span of the histogram timeline and showing how to select a portion of the histogram timeline for viewing such thumbnail representations of such objects corresponding to such selected portion.

FIG. 3B is a flow diagram that illustrates the generation of a histogram timeline and further steps involved in interacting with it. The histogram timeline is formed as shown in step 130 by counting the number of objects in the database that are associated with each date. The result, internally, is an array of ordered pairs. One number in the pair represents a given date, and the associated number represents the number of objects associated with the date.

In step 132, the histogram timeline is displayed graphically to the user, as shown in FIG. 6A, with a predetermined range of dates (timeline) based, for example, on the earliest to latest dates associated with all of the objects in the chosen database. The histogram is displayed with two time scales, a primary time scale having coarse intervals, such as whole years, and an adjacent secondary time scale having finer intervals such as whole months.

Figure 6C:
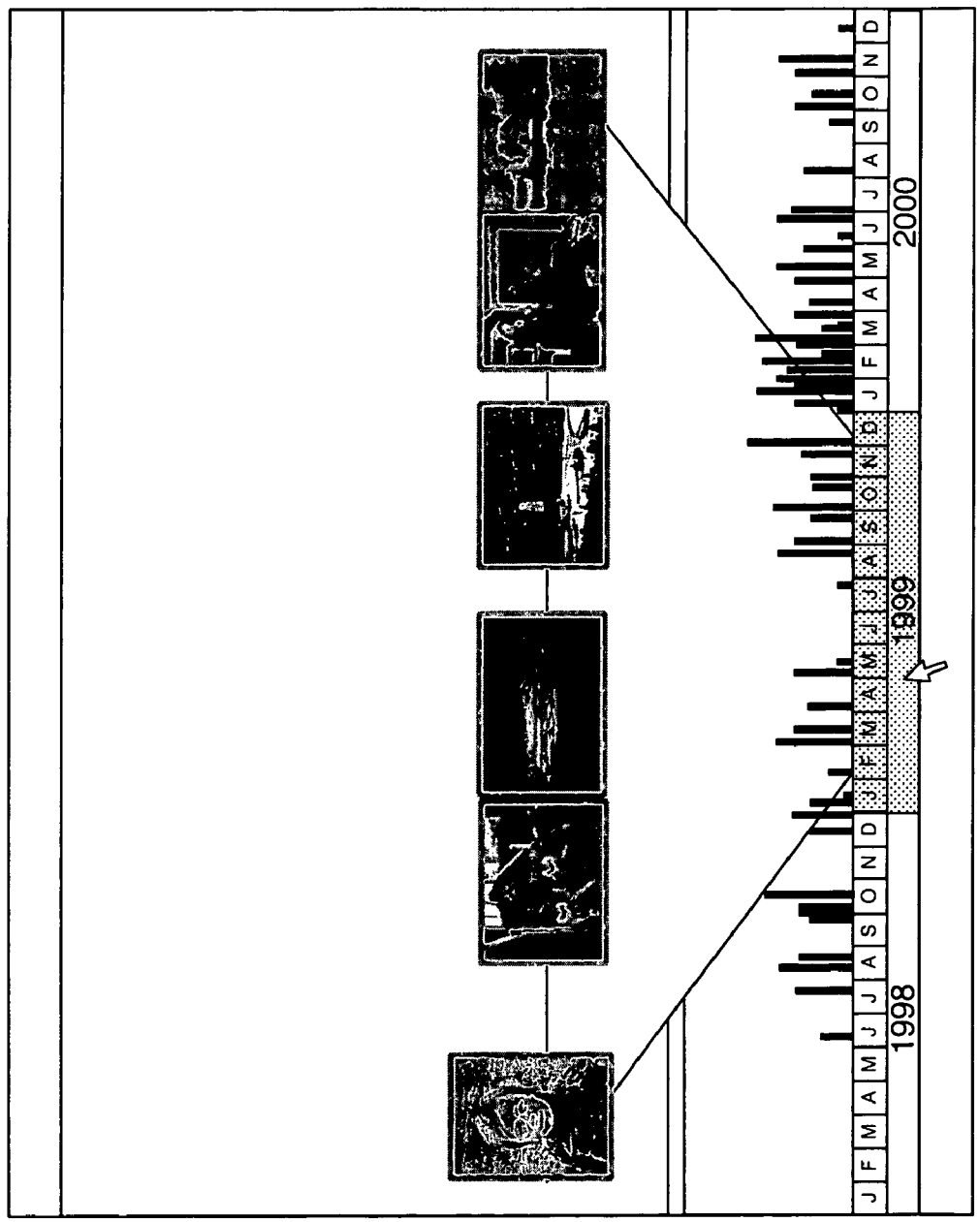
FIG. 6C is a depiction of a histogram timeline and thumbnail representations on a display screen during selection of a shortened time scale.
Figure 6D:
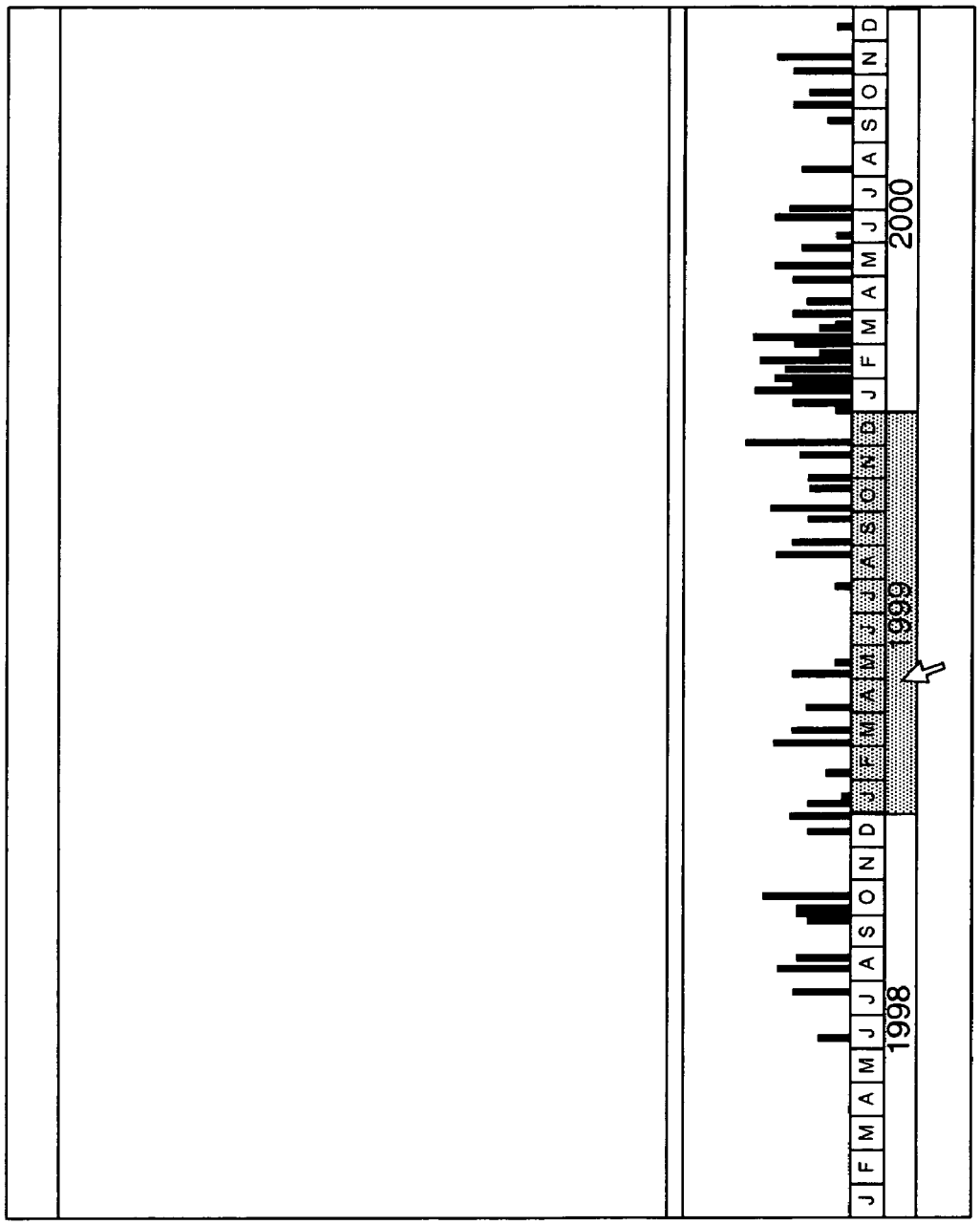
FIG. 6D is a depiction of a histogram timeline without thumbnail representations on a display screen during selection of a shortened time scale.

In step 134, the user determines whether or not the timeline span is too large to work with effectively. If so, then in step 136 the user selects an interval either on the coarse primary time scale or the finer secondary time scale. FIG. 6C illustrates selection of the year 1999 on the coarse time scale, with representations of randomly selected objects from that year appearing while the date is selected by, for example, holding down a mouse button. In addition, the region denoting the year 1999 is highlighted to suggest selection. The appearance of the representations can persist as long the mouse button is held down by the user. Alternatively, if the display of representations is slow relative to the amount of time the user wishes to hold down the mouse button, only the region denoting the year 1999 is highlighted without displaying any representations, as illustrated in FIG. 6D.

Figure 6E:
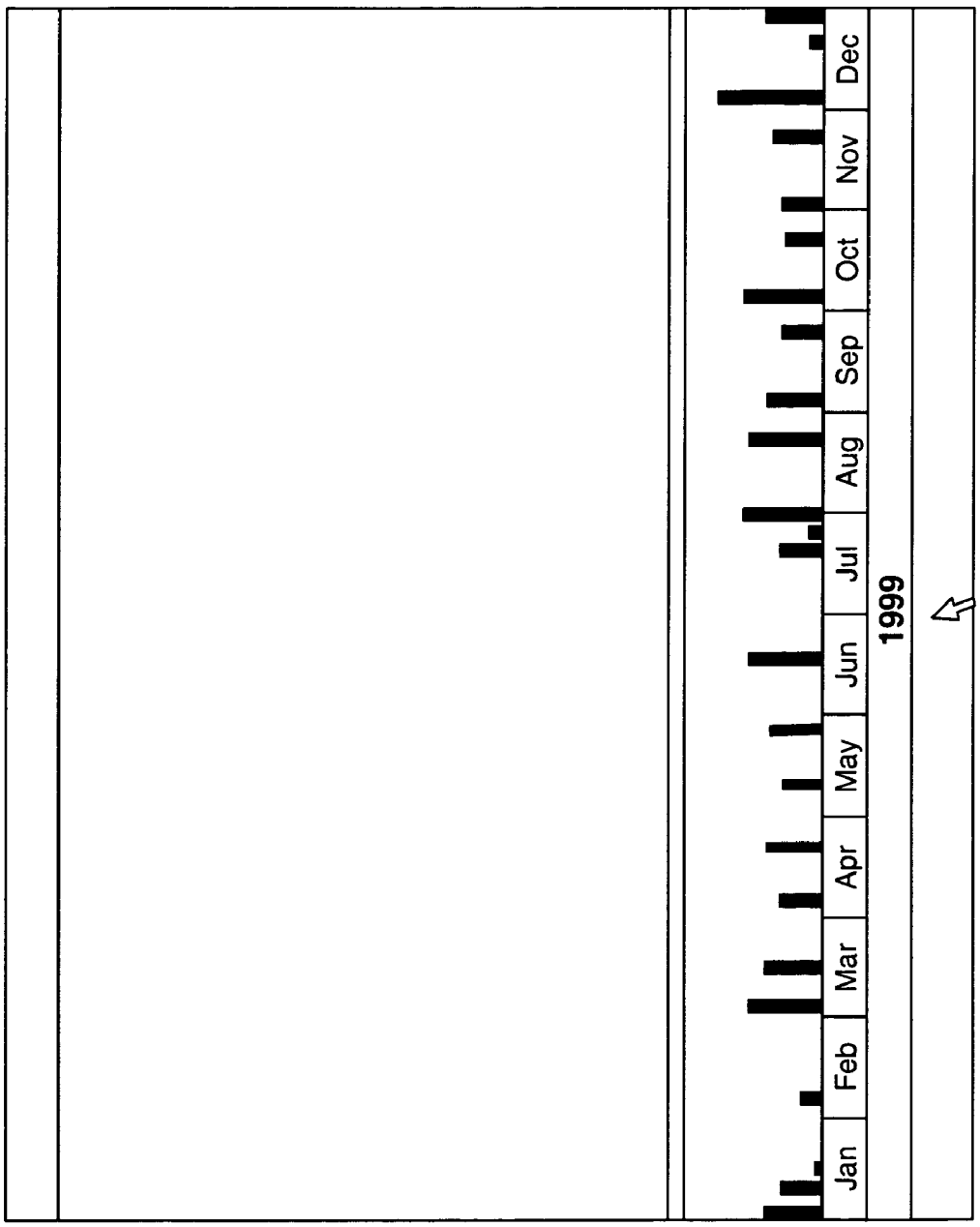
FIG. 6E is a depiction of a histogram timeline on a display screen after selection of a shortened time scale.
Figure 6F:
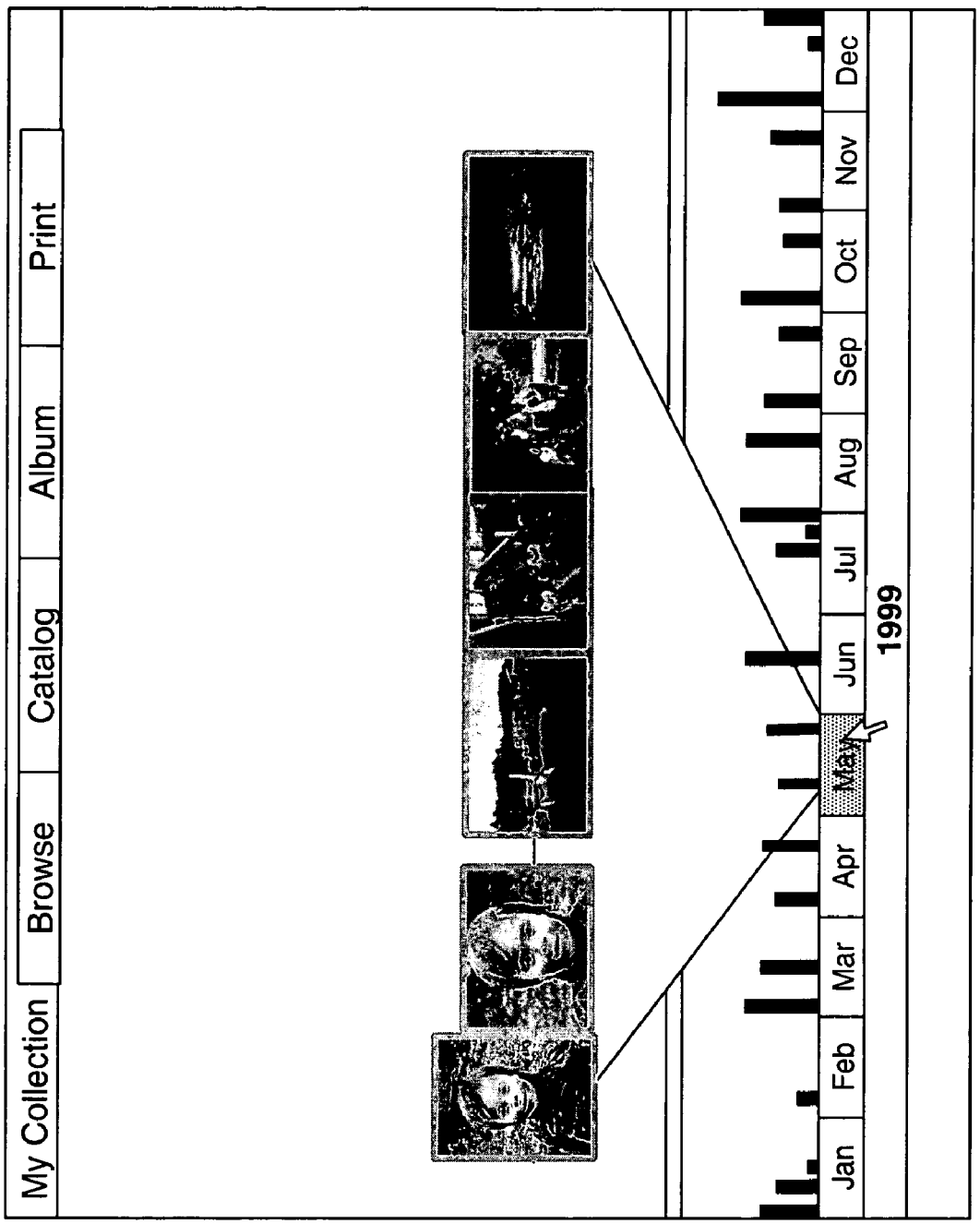
FIG. 6F is a depiction of a histogram timeline and thumbnail representations on a display screen during further selection of a shortened time scale.
Figure 6G:
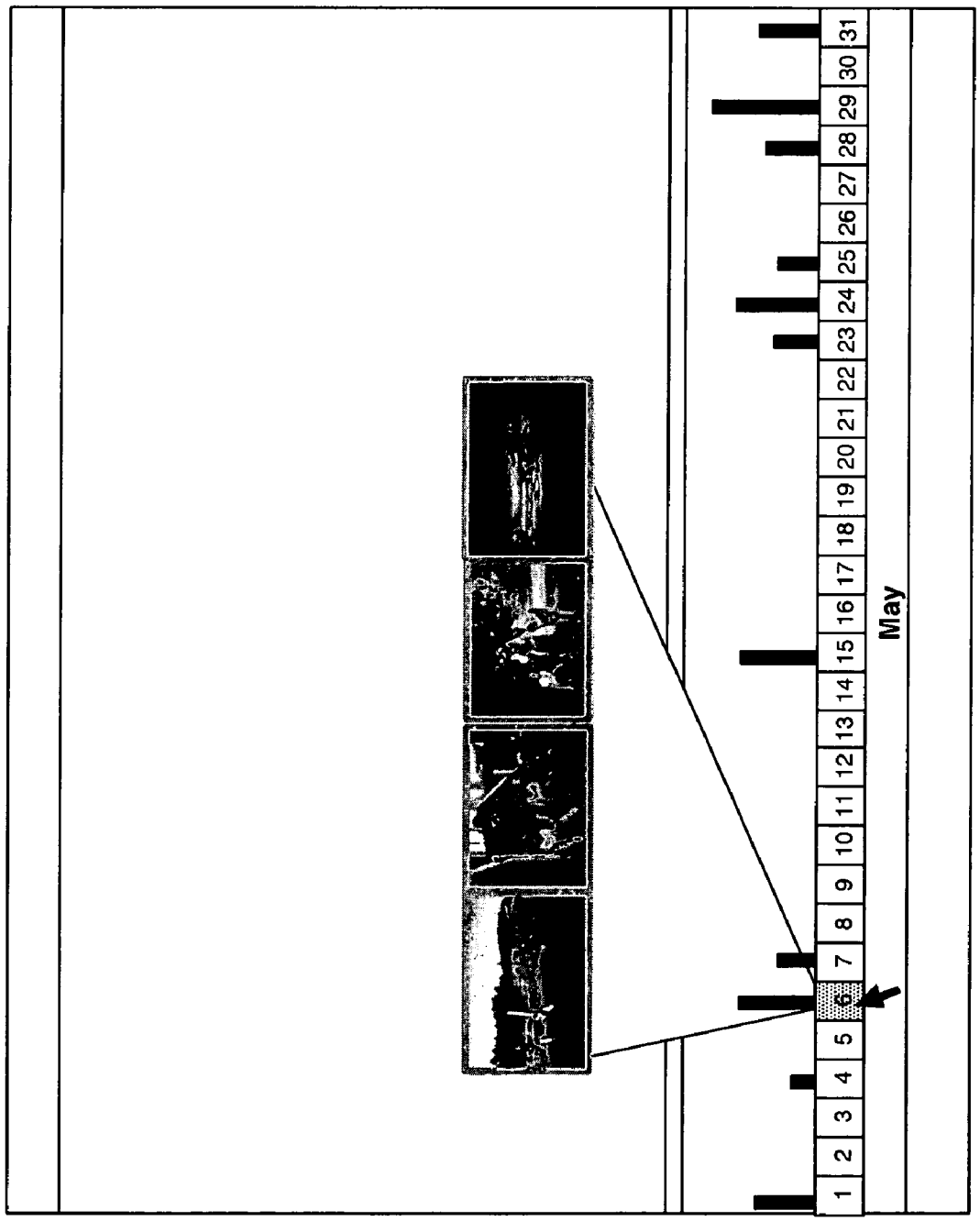
FIG. 6G is a depiction of a histogram timeline and thumbnail representations on a display screen during further selection of a shortened time scale.

Upon release of the mouse button by the user, the histogram timeline is redisplayed according step 138 of FIG. 3B, with the earliest and latest dates of the histogram timeline changed to correspond with the span of the interval selected, as illustrated in FIG. 6E. If the process is repeated, then the primary and secondary timeline intervals are changed as appropriate. For example, if the user selects the month of May 1999 as shown in FIG. 6F, then new thumbnail or iconic representations corresponding to objects associated with May 1999 are displayed while the mouse button is held down by the user. When the user releases the mouse button, histogram timeline is redisplayed such that the earliest and latest dates of the histogram timeline correspond with the month of May 1999. The coarse intervals are then months and the fine intervals days as illustrated in FIG. 6G. Selection of any day in the month, also shown in FIG. 6G, results in thumbnail or iconic representations to be displayed, corresponding to digital multimedia objects associated with that day.

At any point in the process, as shown in step 144 of FIG. 3B, the user can select a date by selecting a bar on any of the histogram timeline representations, as illustrated earlier in FIG. 6B. Representations of digital multimedia objects corresponding to the date are then displayed as shown in step 146. If the user was interested in a particular thumbnail representation according to step 142, the user could then view or otherwise interact with the actual object or set of objects by, for example, "double clicking" on a representation, as shown in step 148.

Figure 4:
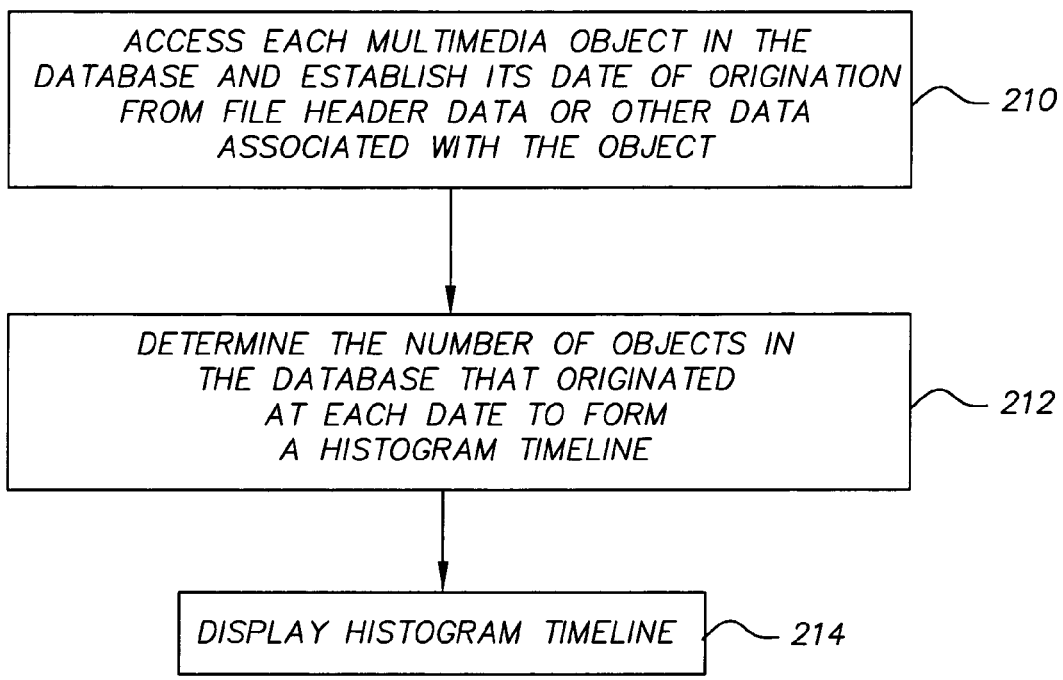
FIG. 4 is a flow diagram showing, in more detail, how a histogram timeline can be made.

FIG. 4 is a flow diagram that describes in more detail how a histogram timeline in accordance with the present invention can be generated. In step 210, each multimedia object in the database is accessed and a date of origination is established from either header data, such as capture date from a digital camera, or from some other data associated with the object. For example, in the absence of reliable header information, the object's file origination date could be used. Alternatively, user-entered annotation could be searched. In step 212, the number of objects associated with each date are determined, to form a histogram timeline. Finally, in step 214, the histogram timeline is displayed to the user.

Figure 5:
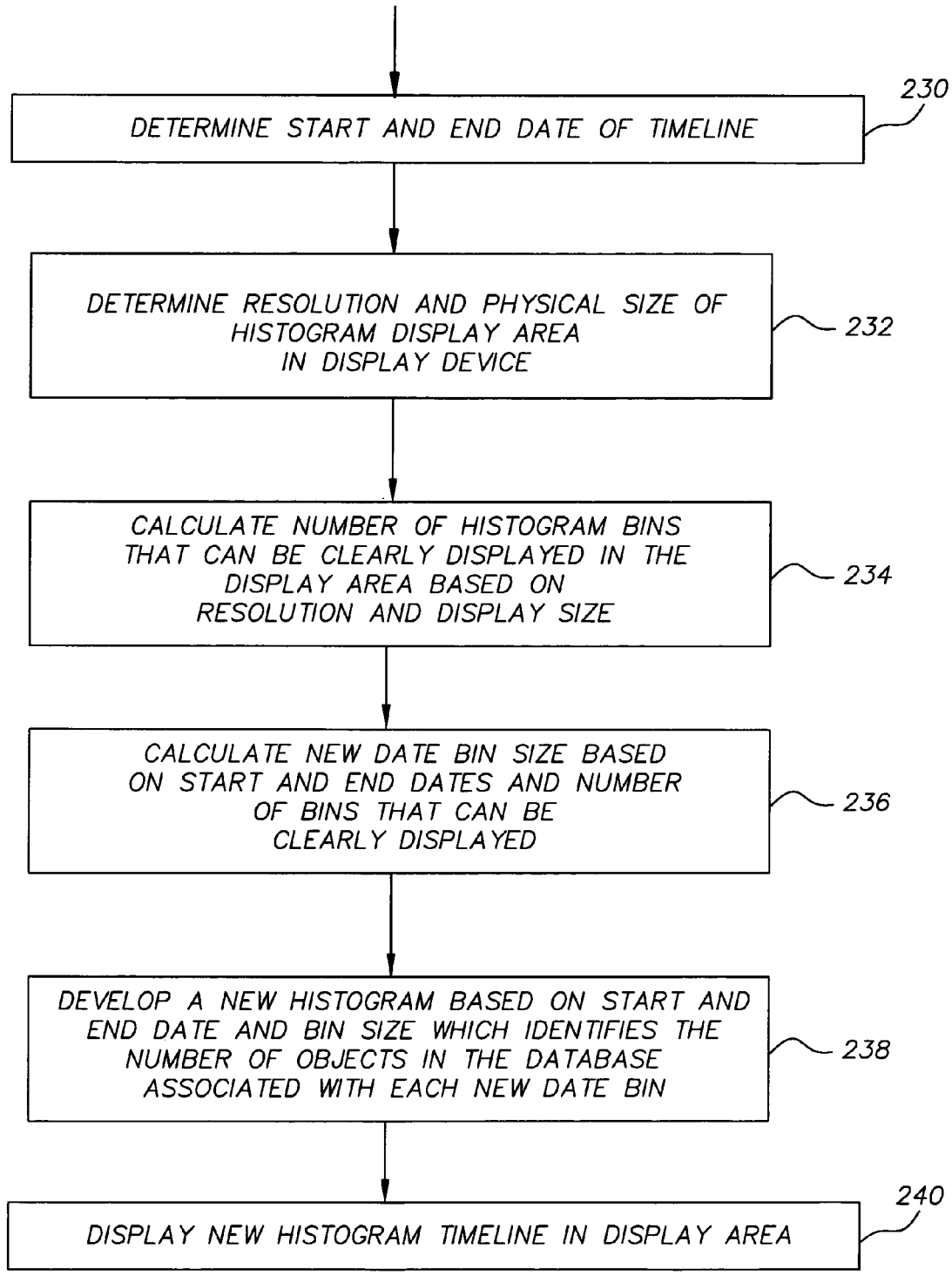
FIG. 5 is a flow diagram showing how the histogram timeline can be made responsive to the resolution and size of the display device.

FIG. 5 depicts a flow diagram showing how the histogram timeline can be made responsive to the resolution and size of the display device. This can be important if the histogram is to be displayed on a portable device such as a cellular phone or personal digital assistant where display resolution and size are limited. It is also useful on any display if the time span of the histogram timeline is very long and individual time periods cannot be adequately displayed.

Once the histogram timeline is generated, the start and end dates of the histogram timeline to be displayed are determined as shown in step 230. In step 232, the resolution and physical size of the display area are determined. For example, resolution could be expressed as the number of horizontal and vertical pixels constituting the display area, and the size of the display area could be expressed as horizontal and vertical dimensions in millimeters.

Next, in step 234, the number of histogram bins that can be clearly displayed is calculated. The number of histogram bins that can be clearly displayed can, for example, include additional factors such as a human visual system model.

In step 236, based on the number of histogram bins that can be clearly displayed and the desired start and end date of the histogram timeline, new time period sizes are calculated. In step 238, a new histogram timeline is generated with the modified bin sizes. Finally, in step 240, the modified histogram timeline with more visible bin size is displayed.

It should be understood that the histogram timeline can be applied to browsing of large image collections on a Personal Computer or on a portable imaging device such as camera phones, personal digital assistants (PDA), digital cameras, and/or multimedia video/audio devices. For example, a graphic user interface that displays images clustered by event/sub-event versus a time element such as day, month, and year could help a user to quickly browse a large amount of images/video on a Personal Computer or small display using simple controls.

Event and sub-events could be determined automatically using algorithms that analyze captured date and time, as well as the color histogram of images. Event boundaries could be determined by applying a 2-means clustering algorithm to the time difference histogram associated with the input images. For each event detected, sub-event boundaries could be determined using a block histogram correlation method. These methods have been disclosed in prior art U.S. Pat. No. 6,351,556. Other methods of detecting event and sub-event clusters could also be used in place of the above techniques.

The above described event, sub-event, and relative time methods could be displayed using graphic user interfaces that allow quick navigation through a large amount of images and video clips.

Figure 7:
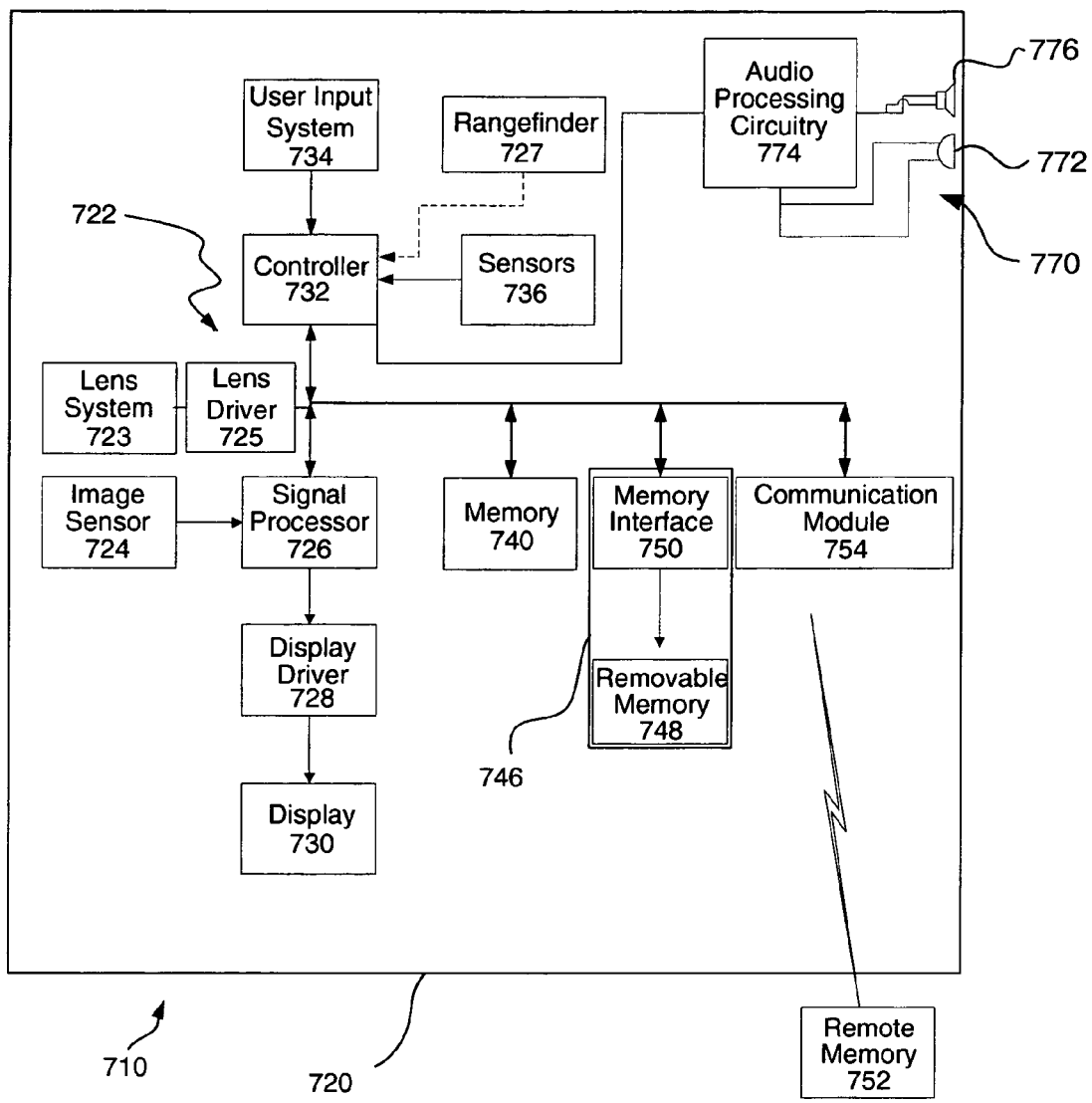
FIG. 7 is a block diagram for another system for practicing the present invention.
Figure 8:
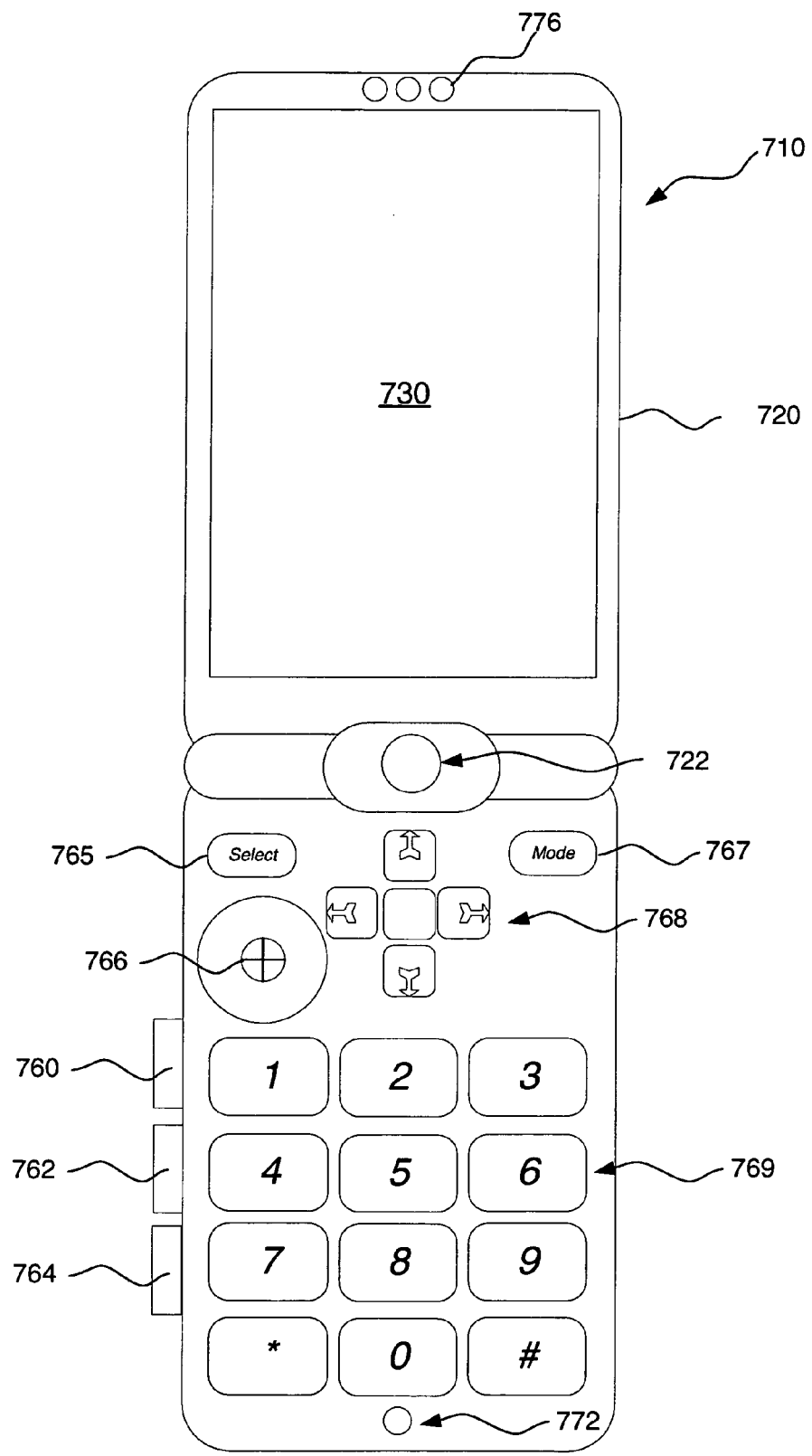
FIG. 8 shows an exterior elevation view of one embodiment of the system of FIG. 7.

FIG. 7 shows a block diagram of one embodiment of another system 710 for practicing the present invention. FIG. 8 shows an exterior view of one embodiment of system 710. As shown in FIG. 7, system 710 is portable and comprises a body 720 containing an optional image capture system 722 that is adapted to co-operate with a signal processor 726, an optional display driver 728 and display 730, controller 732 and user input system 734 as illustrated in FIG. 7 to allow for the capture and/or review of digital multimedia objects.

The embodiment of body 720 shown in FIG. 8 is consistent with clamshell type cellular phones known in the art. However, body 720 can have other configurations, and other shapes. In this embodiment, optional image capture system 722 comprises a lens system 723, an image sensor 724 and a lens driver 725. In operation, light from a scene is focused by lens system 723 to form an image on image sensor 724. Lens system 723 can have one or more elements. Lens system 723 can be of a fixed focus type or can be manually or automatically adjustable. Lens system 723 is optionally adjustable to provide a variable zoom that can be varied manually or automatically. Other known arrangements can be used for lens system 723. A lens driver 725 is provided for automatically adjusting lens system 723. Lens driver 725 can be operated by a controller 732 or it can be operated directly by a rangefinder 727 where applicable.

Light from the scene that is focused by lens system 723 onto image sensor 724 is converted into image signals representing an image of the scene. Image sensor 724 can comprise a charge coupled device (CCD), a complimentary metal oxide semiconductor (CMOS), or any other electronic image sensor known to those of ordinary skill in the art. Such image signals can be in digital or analog form. Typically such image signals comprise sampled analog signals.

Signal processor 726 receives image signals from image sensor 724 and transforms the image signals into a digital multimedia object in the form of digital data. In the embodiment illustrated, signal processor 726 has an analog to digital conversion capability. Alternatively, an analog to digital converter (not shown) can be positioned between image sensor 724 and signal processor 726 to convert one or more of the image signals into a digital multimedia object. In this alternative, signal processor 726 can comprise a digital signal processor.

The digital multimedia object provided by signal processor 726 can comprise one or more still images, multiple still images and/or a stream of apparently moving images such as a video segment. Where the digital image data comprises a stream of apparently moving images, the digital image data can comprise image data stored in an interleaved or interlaced image form, a sequence of still images, and/or other forms known to those of skill in the art of video.

Signal processor 726 can apply various image processing algorithms to the image signals when forming a digital multimedia object. These can include, but are not limited to, color and exposure balancing, interpolation and compression.

A controller 732 controls the operation of system 710, including but not limited to optional image capture system 722, display 730 and memory such as memory 740 during imaging operations. Controller 732 causes image sensor 724, signal processor 726, memory 740 and display 730 to capture, process, store and display images in response to signals received from a user input system 734, data from signal processor 726 and data received from optional sensors 736. Controller 732 can comprise a microprocessor such as a programmable general-purpose microprocessor, a dedicated micro-processor or micro-controller, or any other system that can be used to control operation of system 710.

Controller 732 cooperates with a user input system 734 to allow system 710 to interact with a user. User input system 734 can comprise any form of transducer or other device capable of receiving an input from a user and converting this input into a form that can be used by controller 732 in operating system 710. For example, user input system 734 can comprise a touch screen input, a touch pad input, a 4-way switch, a 5-way switch, a 6-way switch, an 8-way switch, a stylus system, a trackball system, a joystick system, a voice recognition system, a gesture recognition system or other such systems. In the embodiment shown in FIGS. 7 and 8, user input system 734 includes a capture button 760 that sends a trigger signal to controller 732 that can indicate a desire to capture a still image or other digital multimedia object.

In the embodiment of system 710 shown in FIGS. 7 and 8, user input system 734 also includes a wide-angle zoom button 764, and a tele-zoom button 762 that cooperate with controller 732 to control the zoom settings of lens system 723 causing lens system 723 to zoom out when wide-angle zoom button 764 is depressed and to zoom out when tele-zoom button 762 is depressed. Wide-angle zoom button 764 and tele-zoom button 762 can also be used to provide signals that cause signal processor 726 to process image signal so that the digital still image or other digital multimedia object formed thereby appears to have been captured at a different zoom setting than that actually provided by the optical lens system. This can be done by selecting a subset of the image signal for use in forming the digital multimedia object and optionally interpolating a subset of the image signal to form the digital image. User input system 734 can also include other buttons and input including a select button 765, a joystick 766 shown in FIG. 8, the mode selector button 767, 5-way switch 768 shown in FIG. 8, and keypad 769 the functions of which will be described in greater detail below.

Sensors 736 are optional and can include light sensors, position sensors and other sensors known in the art that can be used to detect conditions in the environment surrounding portable system 710 and to convert this information into a form that can be used by controller 732 in governing operation of system 710. Range finder 727 can also be used to detect conditions such as distance to subject. Sensors 736 can also include biometric sensors (not shown) adapted to detect characteristics of a user for security and affective imaging purposes.

Controller 732 causes an image signal and corresponding digital multimedia object to be formed when a trigger condition is detected. Typically, the trigger condition occurs when a user depresses capture button 760, however, controller 732 can determine that a trigger condition exists at a particular time, or at a particular time after capture button 760 is depressed. Alternatively, controller 732 can determine that a trigger condition exists when optional sensors 736 detect certain environmental conditions such as a pulse of infra red light.

Controller 732 can also be used to generate metadata in association with each multimedia object. Metadata is data that is related to a digital multimedia object or a portion of a digital multimedia object but that is not necessarily observable in the digital multimedia object as presented to a user. In this regard, controller 732 can receive signals from signal processor 726, user input system 734, and other sensors 736 and, can optionally generate metadata based upon such signals. The metadata can include, but is not limited to, information such as the time, date and location that the digital multimedia object was captured, the type of image sensor 724 used in capturing the digital multimedia object, mode setting information, integration time information, taking lens unit setting information that characterizes the process used to capture the archival image and processes, methods and algorithms used by system 710 to form the archival image. The metadata can also include but is not limited to any other information determined by controller 732 or stored in any memory in system 710 such as information that identifies system 710, and/or instructions for rendering or otherwise processing the digital image with which the metadata is associated. The metadata can also comprise an instruction to incorporate a particular message into a digital multimedia object when presented. Such a message can be a text message to be rendered when the digital image is presented or rendered. The metadata can also include audio signals. The metadata can further include digital image data. The metadata can also include any other information entered into system 710.

The digital multimedia objects and optional metadata can be stored in a compressed form. For example, where the digital multimedia object comprises still images, the still images can be stored in a compressed form such as by using the JPEG (Joint Photographic Experts Group) ISO 10918-1 (ITU-T.81) standard. This JPEG compressed image data is stored using the so-called "Exif" image format defined in the Exchangeable Image File Format version 2.2 published by the Japan Electronics and Information Technology Industries Association JEITA CP-3451. Other compression systems such as the MPEG-4 (Motion Pictures Export Group) or Apple Quicktime™ standard can be used to store digital image sequences of streams of image information that are in a video form. Other image compression and storage forms can be used.

The digital multimedia objects and metadata can be stored in a collection in memory such as memory 740. Memory 740 can include conventional memory devices including solid state, magnetic, optical or other data storage devices. Memory 740 can be fixed within system 710 or it can be removable. In the embodiment of FIGS. 7 and 8, system 710 is shown having a memory card slot 746 that holds a removable memory 748 such as a removable memory card and has a removable memory interface 750 for communicating with removable memory 748. The digital multimedia objects and metadata can also be stored in collection in a remote memory system 752 that is external to system 710 such as a memory that is within a personal computer, computer network, networked server such as the Kodak EasyShare Gallery, telecommunication network, telecommunication system In the embodiment shown in FIGS. 7 and 8, system 710 has a communication module 754 for communicating with the remote memory system. Communication module 754 can be for example, an optical, radio frequency or other transducer that converts image and other data into a form that can be conveyed to the remote imaging system by way of an optical signal, radio frequency signal or other form of signal. Communication module 754 can also be used to receive a digital multimedia object and other information from a host computer or network (not shown). Controller 732 can also receive information and instructions from signals received by communication module 754 including but not limited to, signals from a remote control device (not shown) such as a remote trigger button (not shown) and can operate system 710 in accordance with such signals.

Signal processor 726 optionally also uses images signals or the digital images to form evaluation images which have an appearance that corresponds to captured image data and are adapted for presentation on display 730. This allows users of system 710 to observe digital images that are available in system 710 for example images that have been captured by image capture system 722, that are otherwise stored in a memory such as memory 740, removable memory 748 or that are received by way of communication module 754. Display 730 can comprise, for example, a color liquid crystal display (LCD), organic light emitting display (OLED) also known as an organic electroluminescent display (OELD) or other type of video display. Display 730 can be viewable externally as is shown in FIG. 8, or it can be viewable internally for example used in a viewfinder system (not shown). Alternatively, system 710 can have more than one display with, for example, one being viewable externally and one being viewable internally.

Signal processor 726 and controller 732 also cooperate to generate other images such as text, graphics, icons and other information for presentation on display 730 that can allow interactive communication between controller 732 and a user of system 710, with display 730 providing information to the user of system 710 and the user of system 710 using user input system 734 to interactively provide information to system 710. System 710 can also have other displays such as a segmented LCD or LED display (not shown) which can also permit signal processor 726 and/or controller 732 to provide information to the user. This capability is used for a variety of purposes such as establishing modes of operation, entering control settings, user preferences, and providing warnings and instructions to a user of system 710. Other systems such as known systems and actuators for generating audio signals, vibrations, haptic feedback and other forms of signals can also be incorporated into system 710 for use in providing information, feedback and warnings to the user of system 710.

Typically, display 730 has less imaging resolution than image sensor 724. Accordingly, signal processor 726 reduces the resolution from an image signal or digital multimedia object when forming evaluation images adapted for presentation on display 730. Down sampling and other conventional techniques for reducing the overall imaging resolution can be used. For example, resampling techniques such as are described in commonly assigned U.S. Pat. No. 5,164,831 "Electronic Still Camera Providing Multi-Format Storage Of Full And Reduced Resolution Images" filed by Kuchta et al., on Mar. 15, 1990, can be used. The evaluation images can optionally be stored in a memory such as memory 740. The evaluation images can be adapted to be provided to an optional display driver 728 that can be used to drive display 730. Alternatively, the evaluation images can be converted into signals that can be transmitted by signal processor 726 in a form that directly causes display 730 to present the evaluation images. Where this is done, display driver 728 can be omitted.

System 710 captures digital multimedia objects using image sensor 724 and other components of image capture system described above. Imaging operations that can be used to capture digital multimedia objects include a capture process and can optionally also include a composition process and a verification process.

During the optional composition process, controller 732 causes signal processor 726 to cooperate with image sensor 724 to capture digital multimedia objects and present a corresponding evaluation images on display 730. In the embodiment shown in FIGS. 7 and 8, controller 732 enters the image composition phase when capture button 760 is moved to a half depression position. However, other methods for determining when to enter a composition phase can be used. For example, one of user input system 734, for example, joystick 766 shown in FIG. 8 can be depressed by a user of system 710, and this can be interpreted by controller 732 as an instruction to enter the composition phase. The evaluation images presented during composition can help a user to compose the scene for the capture of digital images.

The capture process is executed in response to controller 732 determining that a trigger condition exists. In the embodiment of FIGS. 7 and 8, a trigger signal is generated when capture button 760 is moved to a full depression condition and controller 732 determines that a trigger condition exists when controller 732 detects the trigger signal. During the capture process, controller 732 sends a capture signal causing signal processor 726 to obtain image signals from image sensor 724 and to process the image signals to form digital image data comprising a digital image. An evaluation image corresponding to the digital image is optionally formed for presentation on display 730 by signal processor 726 based upon the image signal. In one alternative embodiment, signal processor 726 converts each image signal into a digital image and then derives the evaluation image from the digital image.

During the verification process, the corresponding evaluation image is supplied to display 730 and is presented for a period of time. This permits a user to verify that the digital image has a preferred appearance.

System 710 can also access collections of digital multimedia objects other than by capturing the images and storing the images in a memory 740 in system 710. For example some or all of a collection of digital multimedia objects can by conveyed to system 710 when such images are recorded on a removable memory that is inserted into memory interface 750. In another example, where communication module 754 is adapted to communicate by way of a cellular telephone network, communication module 754 can be associated with a cellular telephone number or other identifying number that for example another user of the cellular telephone network such as the user of a telephone equipped with a digital camera can use to establish a communication link with system 710 and transmit digital multimedia objects which can be received by communication module 754.

Alternatively, system 710 can use communication module 754 to access collections of digital multimedia objects that are stored outside of body 720 such as in a remote memory 752. For example, when communication module 754 is capable of cellular telephone capabilities or other wireless capabilities, images can be accessed from a cellular phone enabled or other image server such as the aforementioned Kodak EasyShare Gallery, or any other remote memory 752.

Memory 740 or communication module 754 or other circuits and systems of system 710 can have the ability to receive, transmit or otherwise access collections of digital multimedia objects using wireless communication protocols such as the aforementioned Bluetooth standard for wireless communication or wired protocols such as the I.E.E.E. 1394 "Firewire" standard or the universal serial bus (USB) standard.

Accordingly, there are a variety of ways in which system 710 can provide a user with access to a collection of digital multimedia objects and therefore it is not essential that system 710 have an optional image capture system 722 so long as other means including but not limited to those described above are available for importing images into system 710.

As shown in FIGS. 7 and 8, user input system 734 of image capture device 720 provides a variety of user input controls including capture button 760, a tele-zoom setting input 762, a wide zoom setting input 764, a select button 765, a joystick 766, a scene mode selector 767 and a 5-way switch 768. Controller 732 is adapted to increase and decrease the effective zoom ratio of images captured by image capture system 722 in response to signals received from tele-zoom setting input 762 and wide zoom setting input 764 as described above. A mode selector 767 is used to allow a photographer to manually select one of a set of possible modes of operation including, for example, a plurality of different image capture modes for capturing digital multimedia objects using camera 720. In the embodiment illustrated in FIGS. 7 and 8, such different image capture modes can include an automatic mode wherein the image capture settings used for capturing a digital multimedia object are determined automatically by controller 732, a manual mode wherein the settings used for capturing a digital multimedia object are determined based user inputs and/or preferences, an action mode wherein images are captured using image capture settings that are optimized for the capture of rapidly changing scenes, and a portrait mode wherein controller 732 causes images to be captured using image capture settings that are optimized for image capture of a generally still scene.

Controller 732 is also adapted to use signals from joystick 766 and/or 5-way switch 768 to allow a user to make input for use in navigating menus and digital multimedia objects presented on display 730 and for making decisions.

Additionally, in the embodiment of FIGS. 7 and 8, a keypad user input 769 provides a plurality of keys that can be depressed to select one of an alphanumeric set of characters, such as is commonly done to make telephone calls, to communicate using text messaging, or to create text or alphanumeric data for other purposes.

In the embodiments of FIGS. 7 and 8, system 710 has an audio capture unit 770 having an input transducer in the form of a microphone 772 that receives sonic energy and generates signals that are provided to audio processing circuitry 774. Audio processing circuitry 774 is adapted to convert the signals received from microphone 772 into an electronic audio signal representing the pattern of sonic energy incident upon the transducer. Audio processing circuitry 774 is further adapted to receive signals from controller 732 and to cause speaker 776 to generate audible sounds. These can be used in embodiments of system 710 such as a cellular phone embodiment to enable voice communication.

Figure 9:
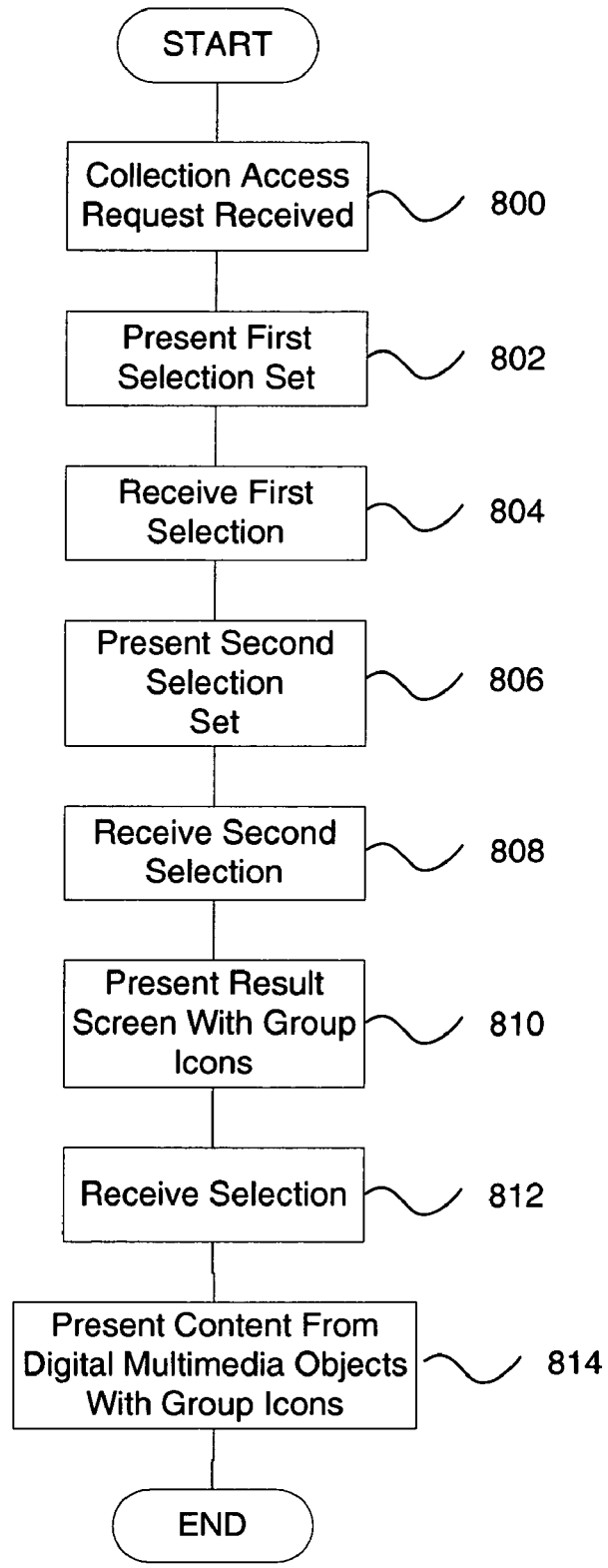
FIG. 9 illustrates a flow diagram of a method for presenting an organized representation of digital multimedia objects.
Figure 10:
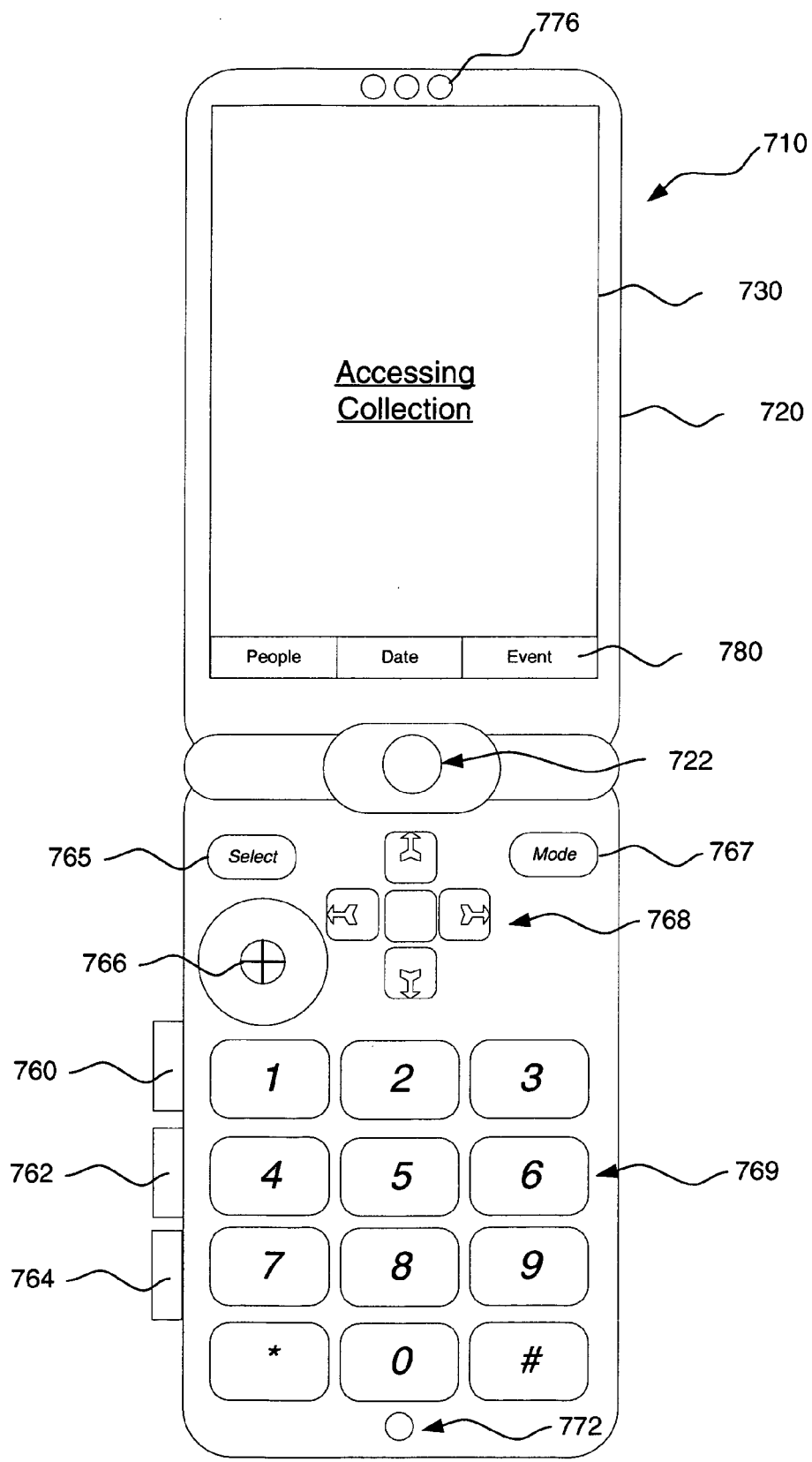
FIG. 10 illustrates a first selection set presented on a display.

FIG. 9 illustrates a flow diagram of a method for presenting an organized representation of digital multimedia objects from a collection of digital multimedia objects using system 710 as described in FIGS. 7 and 8. FIG. 10 illustrates one possible example of what is displayed on display 730 of system 710 during implementation of the method. In the embodiment of the method shown in FIG. 9, a user requests access to a collection of digital multimedia objects. As noted above, such a collection can be found in a memory 740 within system 710, within a remote memory 752, or in some form of networked data source available by way of communication module 754. Typically the user will request access by taking a user input action that causes user input system 734 to generate a request signal that controller 732 receives (step 800) and determines that the user has a desire to access images from a collection.

Figure 11:
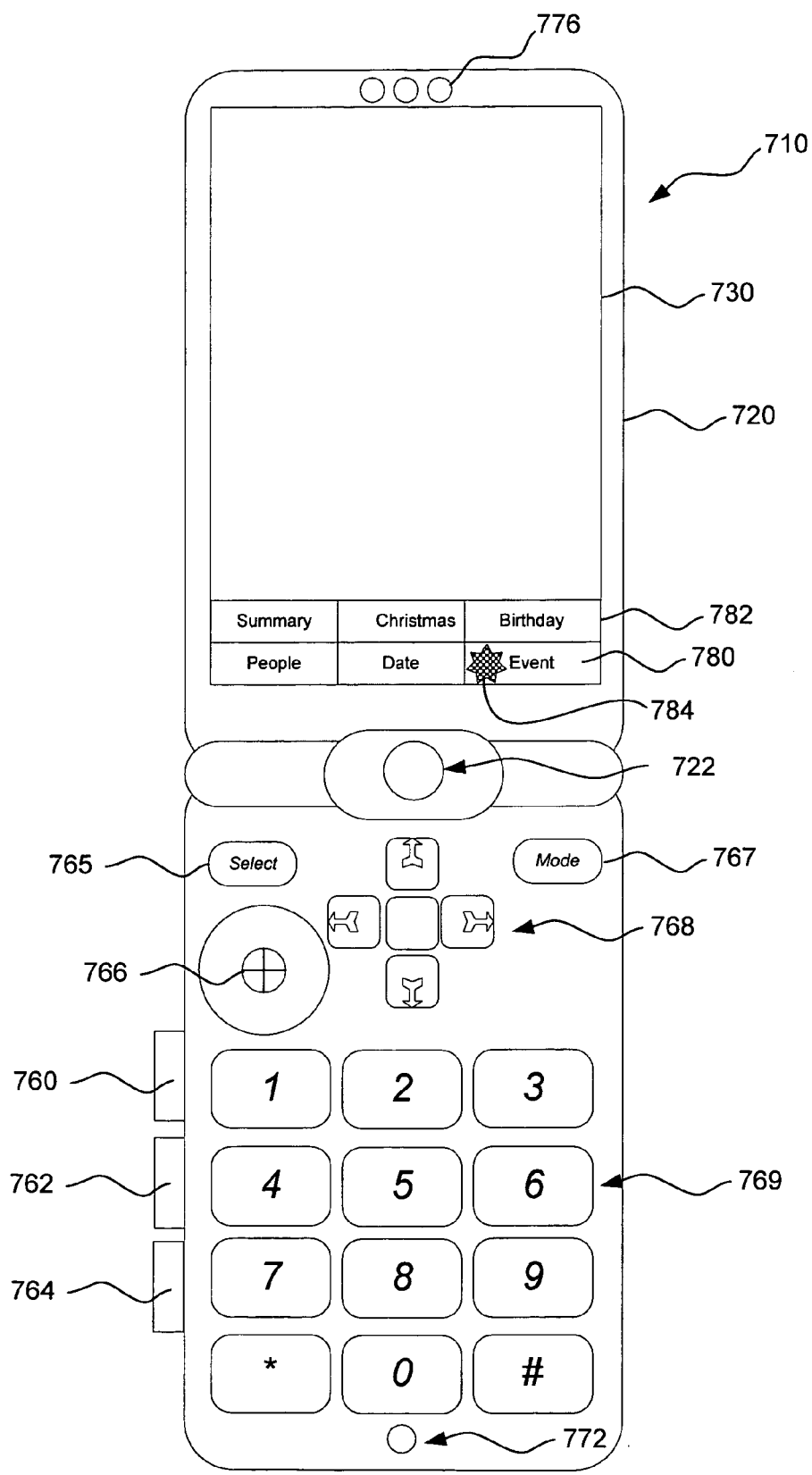
FIG. 11 illustrates a first and second selection set presented on a display.

In response to this, controller 732 causes a first selection set of predefined organizational metaphors 780 to be presented (step 802). The first selection set comprises a predefined set of organizational metaphors that can include, but is not limited to, a chronological metaphor, a geographic metaphor, an image subject metaphor, a categorical metaphor, or an event metaphor, a person metaphor, or an image content metaphor. FIG. 10 shows an example of a first selection set of predefined organizational metaphors 780 that includes events, dates, and people. Controller 732 then monitors signals from user input system 734 to sense a user input signal indicating that a user has made a selection of a first one of the set of organizational metaphors (step 804). In FIG. 11, the user first selects an "event" metaphor for example by pressing an appropriate key on 5-way control 768 or by pressing an appropriate key or arrangement of keys on keypad 769. User input system 734 senses that the appropriate key has been depressed and sends a signal to controller 732. Controller 732 optionally provides an indication 784 of the selection.

Controller 732 then causes display 730 to present a second selection set of predefined organizational metaphors 782 other than the first organizational metaphor (step 806.) Here too the second selection set of predefined organizational metaphors 782 can include, but is not limited to, a chronological metaphor, a geographic metaphor, an image subject metaphor, a categorical metaphor, or an event metaphor, a person metaphor, or an image content metaphor. In the example of this shown in FIG. 12, display 730 presents a second selection set of predefined organizational metaphors 782 that include: "birthdays", "Christmas", and "summary" etc.

In this example, second selection set of organizational metaphors 782 provides organizational metaphors that define the event organizational metaphor with greater specificity and, in that sense, the organizational metaphors of the second selection set of predefined organizational metaphors 782 is determined based upon the first selected organizational metaphor. However, this is not necessary and in other embodiments, second selection set of organizational metaphors 782 can comprise any of a number of other combinations of predefined organizational metaphors that are not determined based upon the first selected organizational metaphor.

Figure 12:
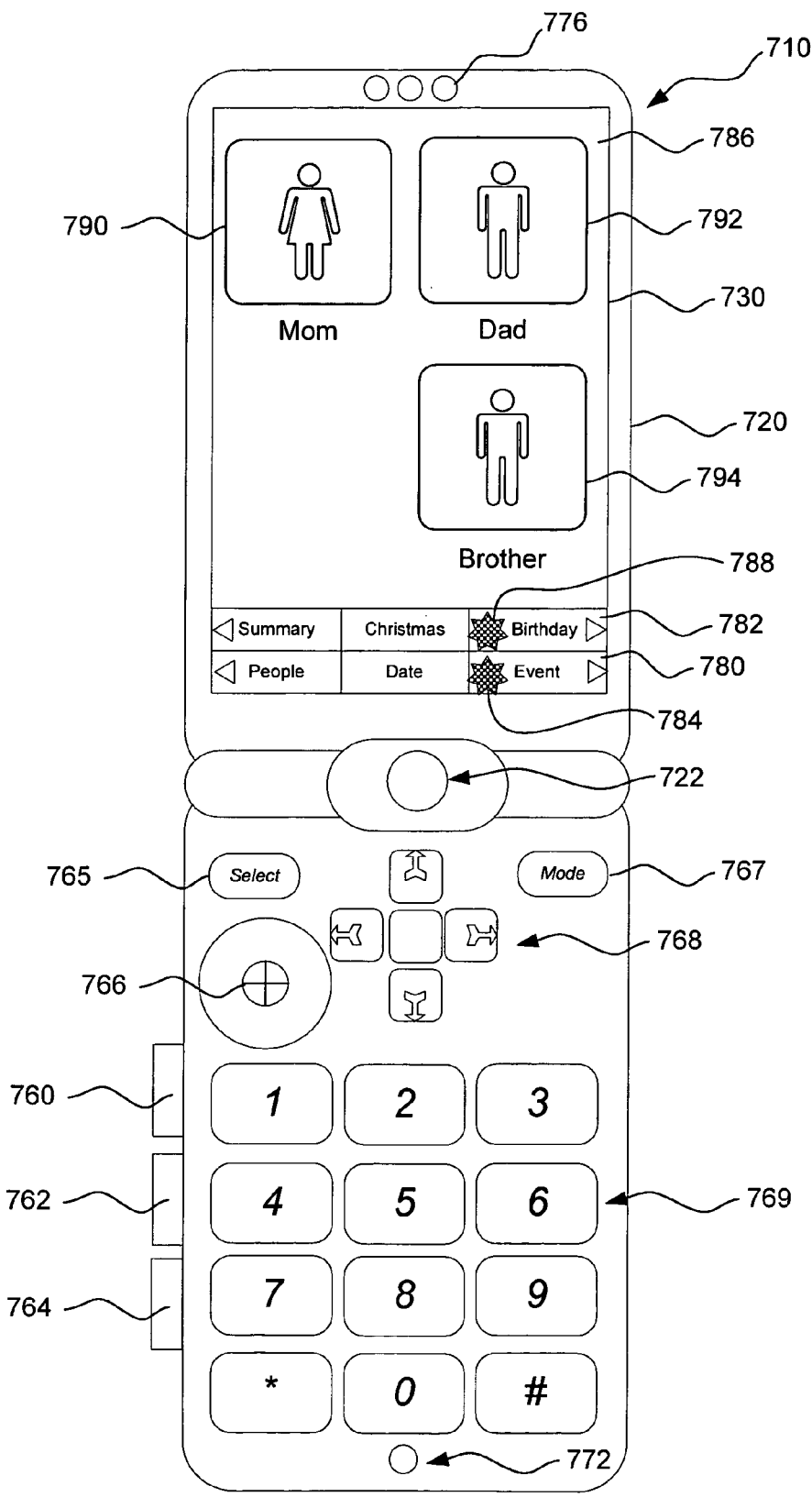
FIG. 12 illustrates a result screen presented on the display with the first and second selection sets.

As is also shown in the example illustration of FIG. 12, controller 732 optionally causes display 730 to continue to present indication 784 of the first selected organizational metaphor 780 at the time that the second selection set of predefined organizational metaphors 782 is presented. This provides a user with an intuitive indication of the ways in which the user has structured the user's request for digital multimedia objects. This indication path comprises highlighting the selected organizational metaphor. Further, FIG. 12 also shows the optional step of providing an indication 788 of which of the second set of organizational metaphors has been selected.

A user then selects a second organizational metaphor using user interface 734. User interface 734 then sends a signal indicative of the selection to controller 732. Controller 732 receives the signal from user interface 734 (step 808) then causes a result screen 786 to be presented on display 730 as illustrated in FIG. 12. Result screen 786 includes at least one of at least two group icons shown in FIG. 12 as group icons 790, 792, and 794. Each group icon 790, 792, and 794 indicates a group of digital multimedia objects chosen from the collection according to rules associated with the selected organizational metaphors and the content of the digital multimedia objects and/or any metadata associated with the digital multimedia objects. For example, the selection "events" and "birthdays" would result in the choice of digital multimedia objects from the collection that are associated with known birthdays of for example family members or co-workers. Alternatively, the selection of events and birthdays could result in the choice of digital multimedia objects from the collection that have image content depicting scenes and circumstances associated with birthdays, such as cake, presents and the like. There are a wide variety of known algorithms that can be used for such purposes. Such algorithms can be executed by signal processor 726, controller 732, and/or other controllers or processors that are external to system 710, such as controllers or processors that are associated with, for example, a remote memory 752 or an image server such as the Kodak EasyShare™ Gallery.

As shown in FIG. 12, result screen 786 presents group icons 790, 792 and 794 each group icon indicating digital multimedia objects chosen according to result presentation rules. The result presentation rules provide rules for selecting the number of group icons and for determining digital multimedia objects to be indicated by each group icon. The number of group icons can be determined in a variety of ways and can be based at least in part upon the number of digital multimedia objects chosen from the collection of digital multimedia objects, the size of the display, a user's preference or based upon at least one of the selected organizational metaphors.

As shown in FIG. 12, group icons 790, 792, and 794 indicate digital multimedia objects related to "mom", "dad" and "brother" respectively. However, it will be appreciated that the user has not actually requested such organization of the digital multimedia objects. This is done for the user's convenience and it is done automatically.

The result presentation rules that govern how digital multimedia objects are associated with a group icon can also be based at least in part upon at least one of the organizational metaphors. For example, the presentation rules for presenting result screen 780 can automatically determine from the selection of events and birthdays that the user most probably wishes to see results organized in accordance with people.

Typically, the size of such group icons will be smaller than the full size of display 730 and will be relative to the number of group icons to be presented at any one time. In one embodiment, controller 732 is operable to determine the number of and or size of group icons so that all group icons can be presented in a single result screen 786. This determination can be made based upon the amount of resolution in display 730 available for presenting group icons, and a desired minimum resolution for presenting each group icon.

Accordingly, in certain embodiments, controller 732 can determine that although there are three potential birthday events in the collection, one for mom, one for dad and one for brother, there is room in display 730 to present only two group icons with each having a minimum set of image resolution. Where this occurs, controller 732 can determine other arrangements of group icons that each include broader criterion for grouping images, such as by associating the chosen digital multimedia objects in groups such as "parents" and "siblings" as shown. Other logical grouping of such images could include, but are not limited to, examples such as "birthdays of adults" and birthdays of children, or even "friends" and "family" group icons. In the embodiment illustrated in FIG. 13, result screen 786 provides two group icons, "birthdays this year" group icon 790 and "birthdays other years" group icon 792.

Figure 13:
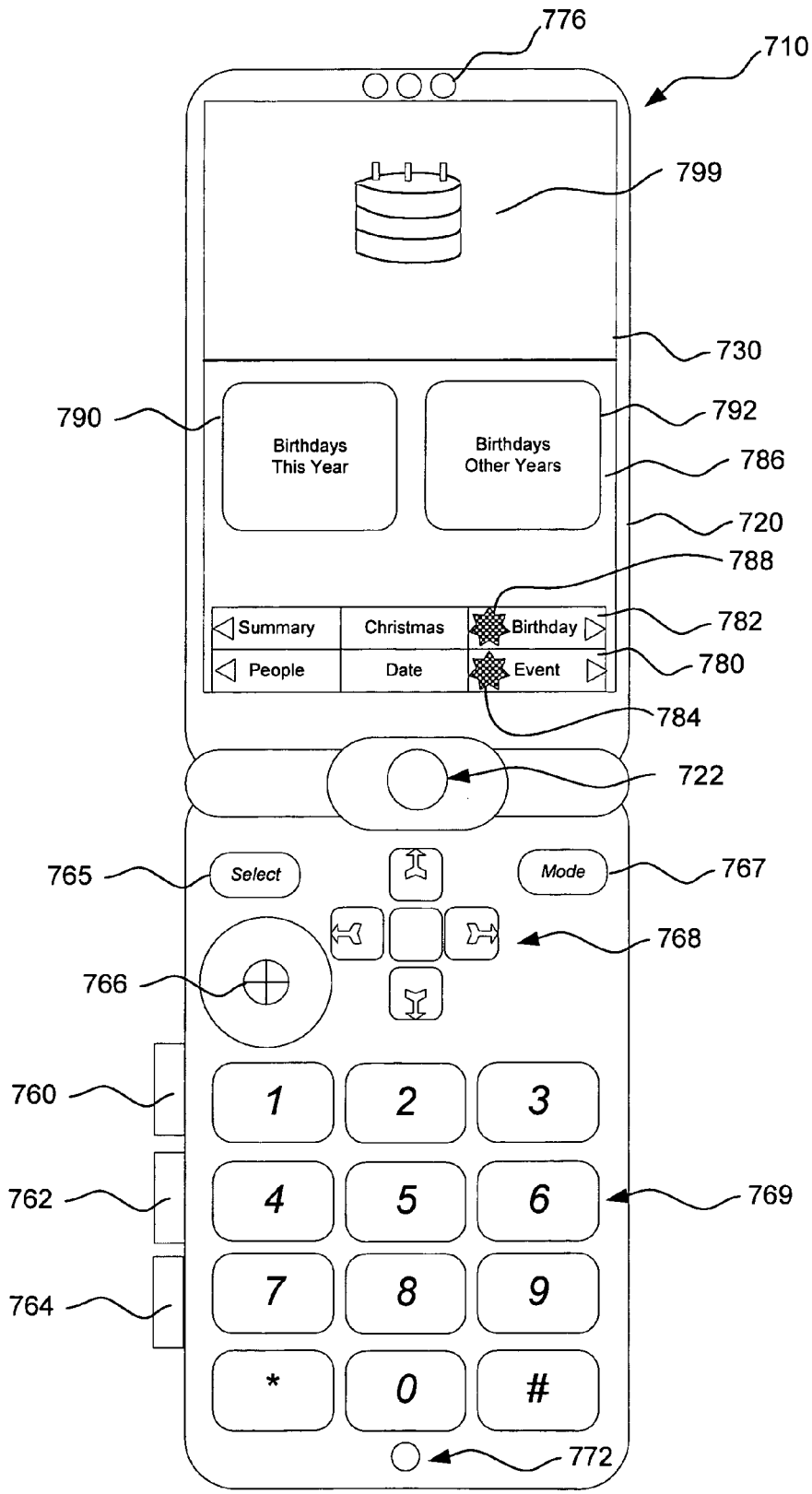
FIG. 13 illustrates a digital multimedia object content presented on a display with a result screen, first selection set and second selection set.

In the example of FIG. 13 result icons 790 and 792 are activatable to cause the presentation of content from at least one of the chosen digital multimedia object in the image group. So, as illustrated in FIG. 13, when a group icon 790 such as "birthdays this year" is selected, image content 799 from digital multimedia objects associated with "birthdays this year" group icon 790 is presented on display 730. Displayed image content 799 can take the form of, for example, a thumbnail representation of image content from each image data file associated with the "birthdays this year" group icon 790. Typically, the size of such thumbnail images will be smaller than the full size of display 730 and will be relative to the number of thumbnails to be presented at any one time.

Figure 14:
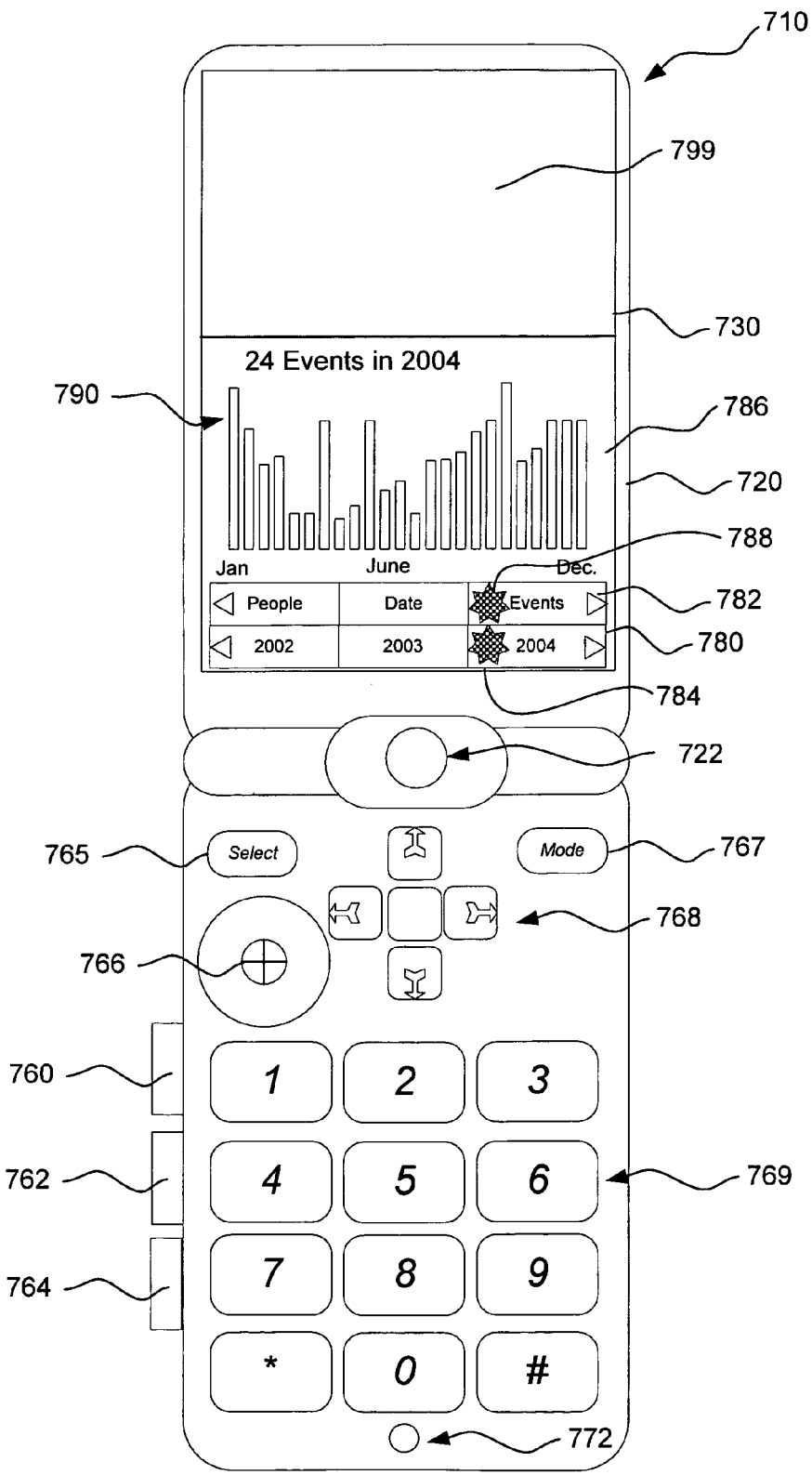
FIG. 14 shows another example of a display presenting a first selection set, a second selection set and a result screen.

FIG. 14 shows another example of wherein a first selection has been made from a first selection set 780 having a chronological organizational metaphor and, wherein an event based metaphor is selected from a second set of organizational metaphors 782, causing a result screen 786 to be presented having a histogram timeline having one axis representing a chronological continuum with event group icons 790 presented in chronological order thereon as generally described above. Each event group icon 790 is activatable to cause the presentation of digital multimedia objects associated with the group.

Figure 15:
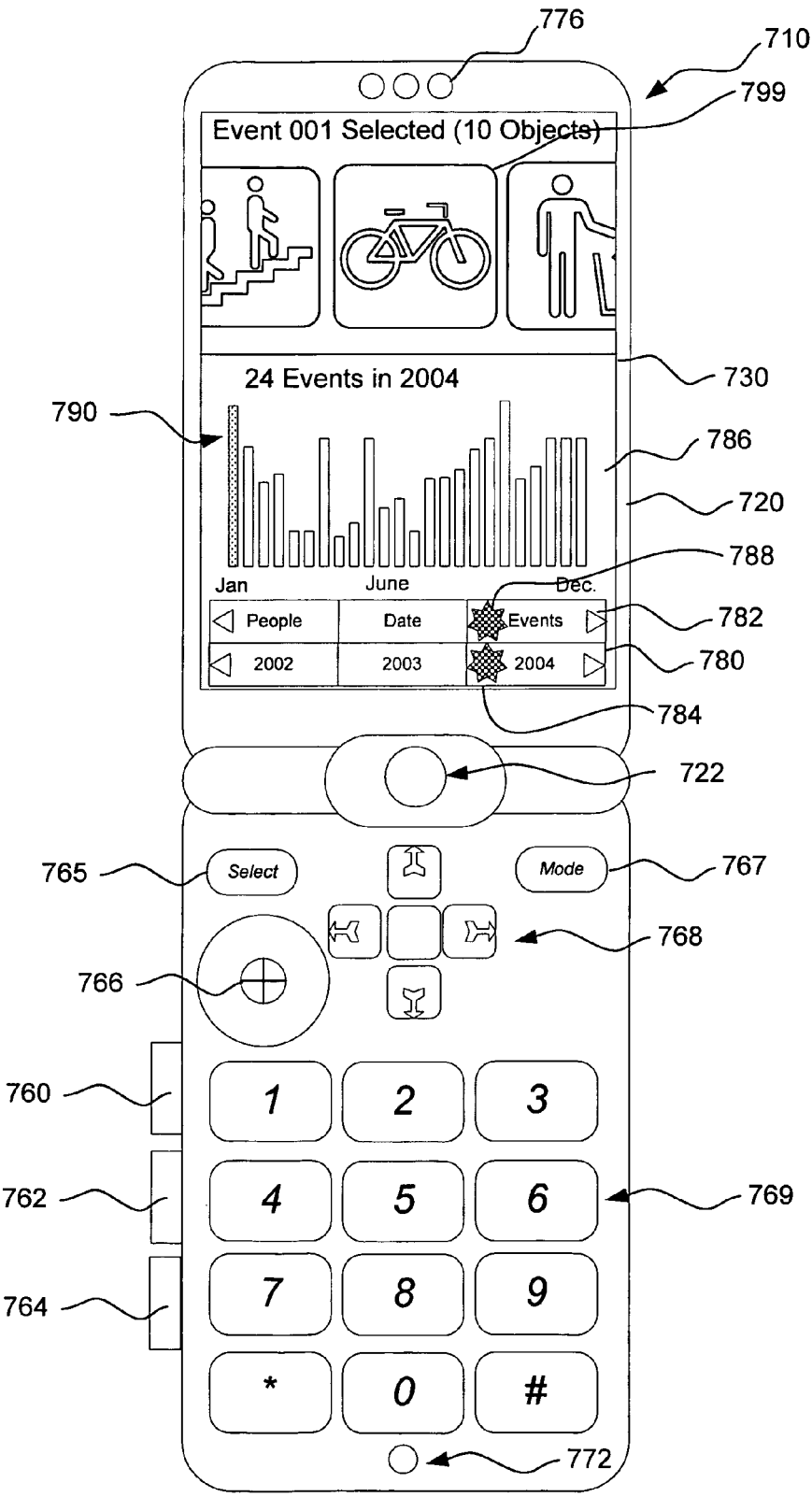
FIG. 15 shows another example of a display presenting a first selection set, a second selection set, a result screen and digital multimedia object content.

It will be appreciated from the examples of FIGS. 9-14 that a progressive set of indications 784 and 788 of selected organizational metaphors is presented in the selection order chosen by the user. In FIG. 14, a first selection set of organizational metaphors 780 is presented in which a series of years is displayed with year 2004 presented with an indication 784 of a user selection of the year 2004. Further, a second set of organizational metaphors 782 is presented and, as shown, the user has selected an event organizational metaphor as suggested by indication 788, causing a result screen 786 histogram timeline display of events that have occurred during that year. The user can navigate left and right using user interface 734 to scroll through the events from the year 2004 and can select one of the events again, using user interface 734. In this embodiment, result screen 786 displays a histogram of event group icons 790 indicate the relative amount of content of each event group icon as compared with adjacent group icons as indicated by the height of the line. When a user selects group icon 790, image content 799 from the digital multimedia objects is presented in a row of three thumbnail images that are formed based upon image presented as shown in FIG. 15. The user can use user interface 734 to scroll horizontally to access the entire set of 740 multimedia objects associated with event group icon 790. Navigation within predefined selections can be performed using user interface 734. This interaction could allow a user to effectively review large volumes of digital multimedia objects using a minimal set of graphic elements, a relatively small display size and without word searching, affording a quick and simple method of navigation.

Figure 16:
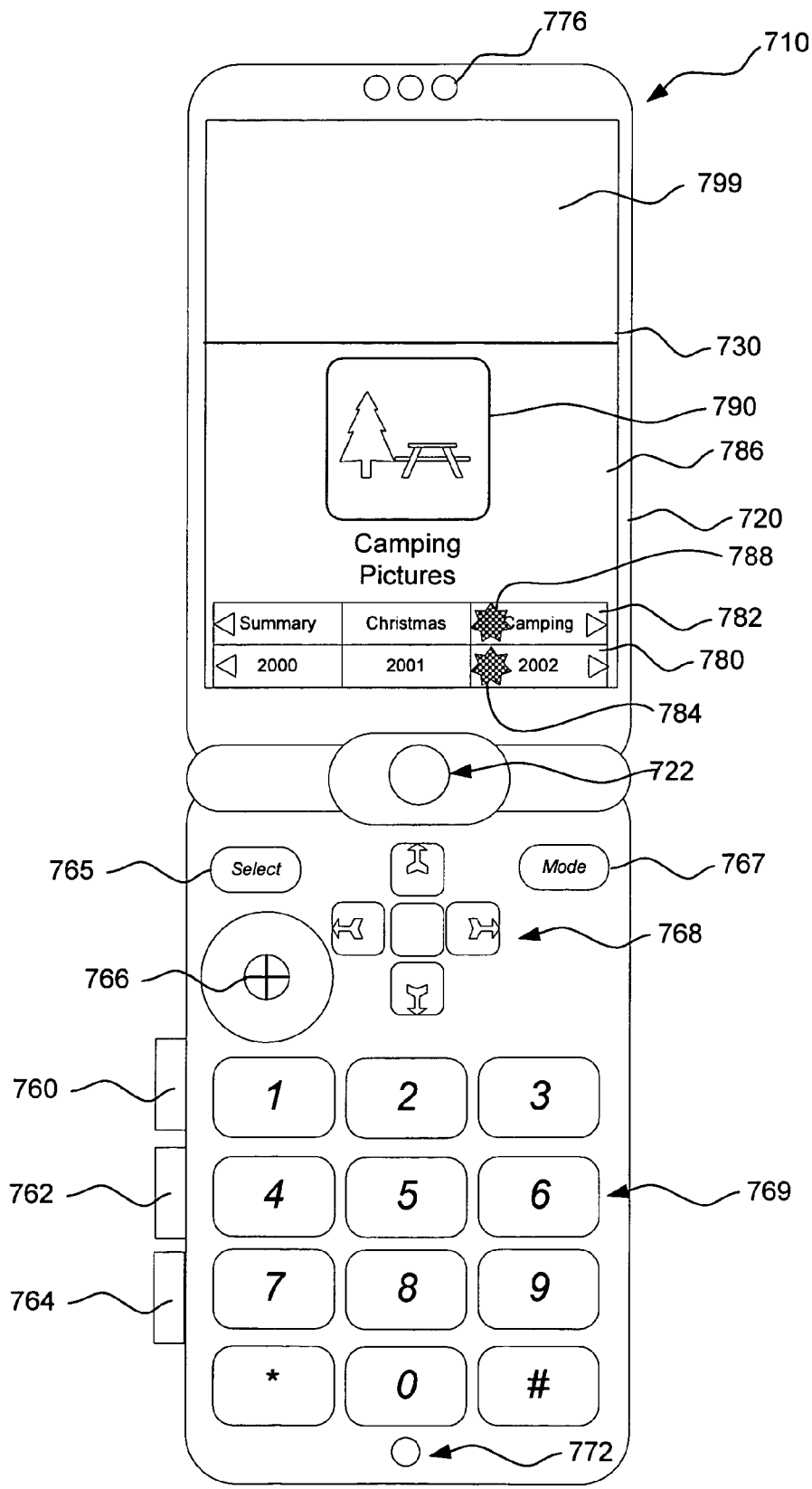
FIG. 16 shows another example of a display presenting a first selection set, a second selection set, a result screen and digital multimedia object content.

Alternative methods of navigation could include replacing the event histogram graphic arrangement of second selection set of organizational metaphors 782 shown in FIGS. 14 and 15 with a second selection set of organizational metaphors 782 in the form of a text event label that describes the event as shown in FIG. 16. The thumbnail image representation of the event group icon 790, shown in FIG. 16, could be determined by the first picture of the event or by analyzing the content of the image to determine the most representative image within the event. In case the event contains digital multimedia objects that comprise video, a series of frames could be analyzed to determine the most representative frame of each clip for this purpose.

Figure 17:
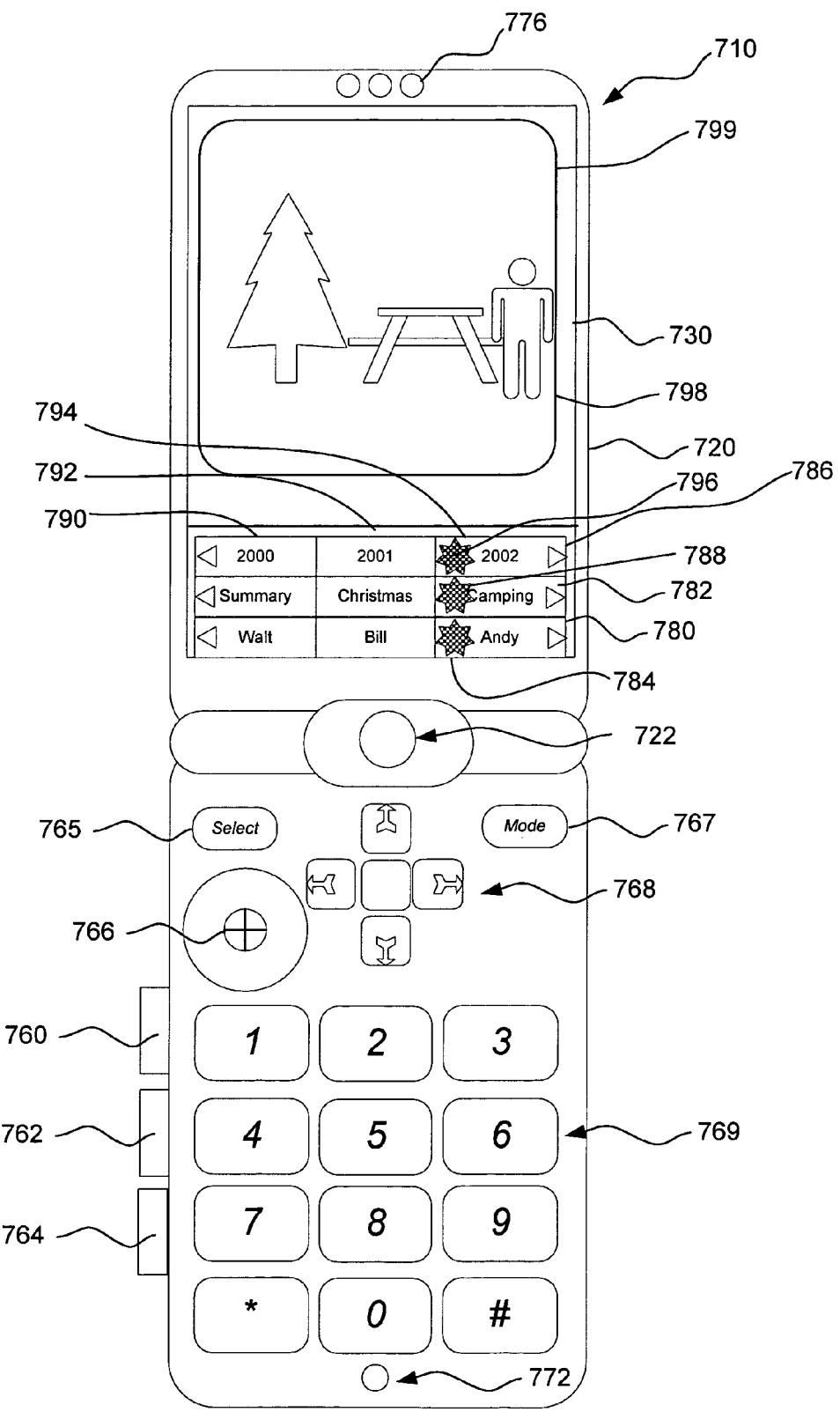
FIG. 17 shows another example of a display presenting a first selection set, a second selection set, a result screen and digital multimedia object content.

FIG. 17 shows another illustration of a display 730 wherein the first selection set of organizational metaphors 780 comprises a list of names which could be entered by the user, or mapped from a buddy list, or address book stored in the device. The second selection set of organizational metaphors 782 presents a listing of different types of events. A result screen 786 presents a set of chronological group icons 790, 792, and 794 which, in this embodiment, includes presented image 798. In other embodiments, first and second sets of organizational metaphors 780 and 782 can be combined or rendered in an overlapping or partially overlapping manner, instead of a linear fashion as illustrated here. This will allow larger portion of the area of display 730 to be used for presenting the image content.

Figure 18:
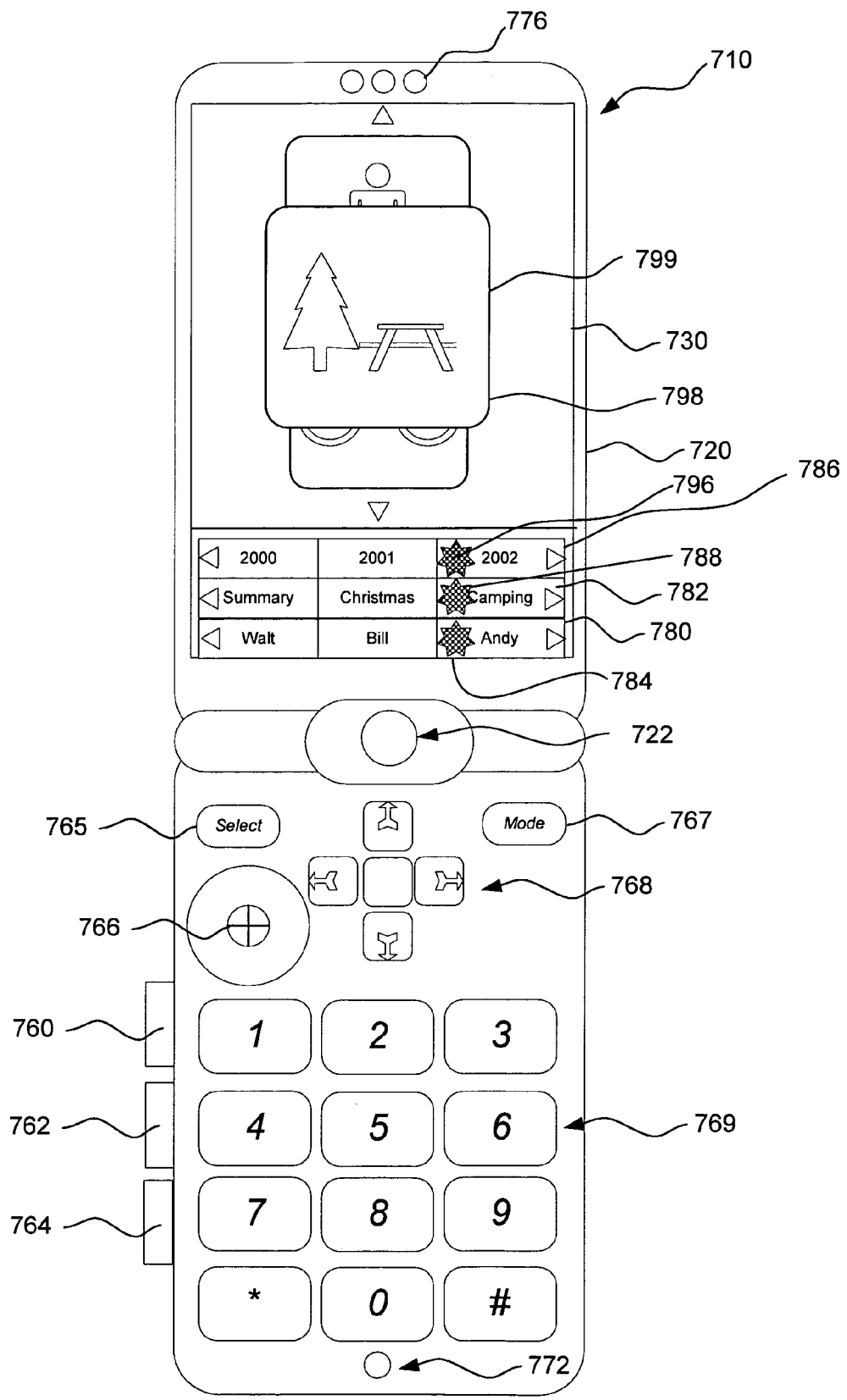
FIG. 18 shows another example of a display presenting a first selection set, a second selection set, a result screen and digital multimedia object content.

In addition to navigating the image content associated with a group icon using the X- and Y-axis, the Z-axis can also be utilized as shown in FIG. 18 wherein a presented graphic is used that provides a visual simulation of a stacked or other depth arrangement of image content. Navigating in and out of the Z-axis could be by any of the user interfaces buttons or controls described above and other controls such as hard buttons or touch screen controls. Further, such navigation can be provided by an embodiment of user interface 734 comprising a motion control interface (not shown) that provides signals to controller 732 with signals causing controller 732 to guide content from a digital multimedia is displayed as the user tilts the input device in or out to cycle through the set sub-event groups. Another example of the Z-axis input device for a Personal Computer is a 3D input control such as Logitech Magellan Space Mouse or a Logitech 3D Connexion CAD Trackball. These input devices could be used in conjunction with software to navigate events and timeline information on a system 10 in a personal computer or in a system 710 such as in the cellular phone embodiment of shown in FIG. 8.

Figure 19:
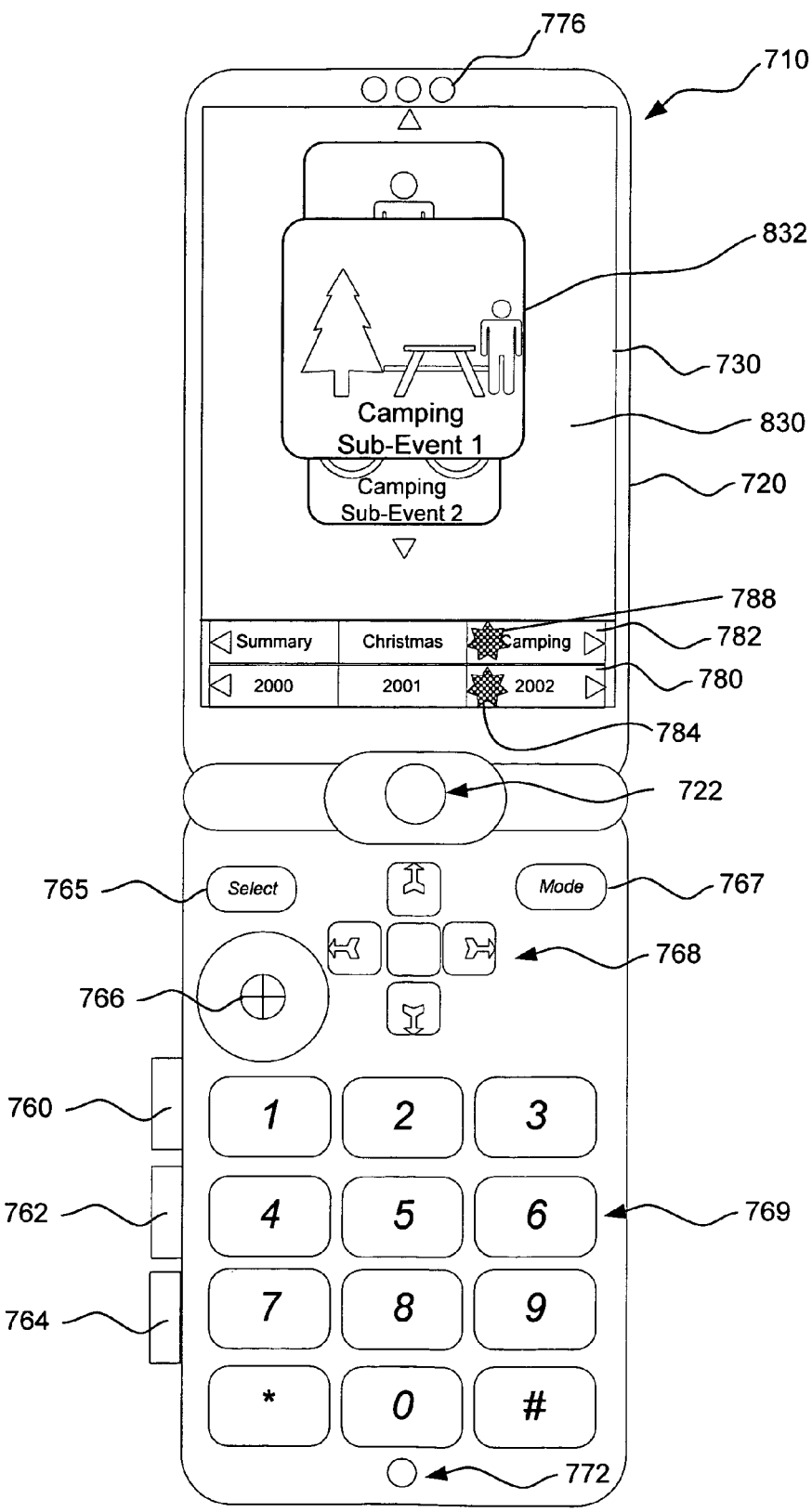
FIG. 19 shows another example of a display presenting a sub-result screen.

There may be circumstances wherein the number of group icons cannot be conveniently presented on display 730, such as where display 730 is capable of presenting only two group icons at a time. Where this occurs it can be useful for controller 732 to provide a sub-result screen 830 as shown in FIG. 19 that presents sub-group icons 832 when a group icon is selected. Sub-group icons 832 can be determined by applying presentation result rules to those images associated with the group icon so that each sub-group icon 832 indicates a portion of the digital multimedia objects that indicate the selected group icon. Referring to FIG. 19, when the user selects a particular event that contains a number of sub-events, a sub-result screen 830 presents a number of sub-group icons 832 arranged in Z-axis arrangement.

Alternatively, where more group icons are generated than can be present in a convenient manner on display 730 at the same time, a result screen can be generated that has a virtual size that is greater than the sizes of display 730 and a user can use user interface 734 to scroll, pan, page zoom or otherwise navigate around in or through the result screen.

Figure 20:
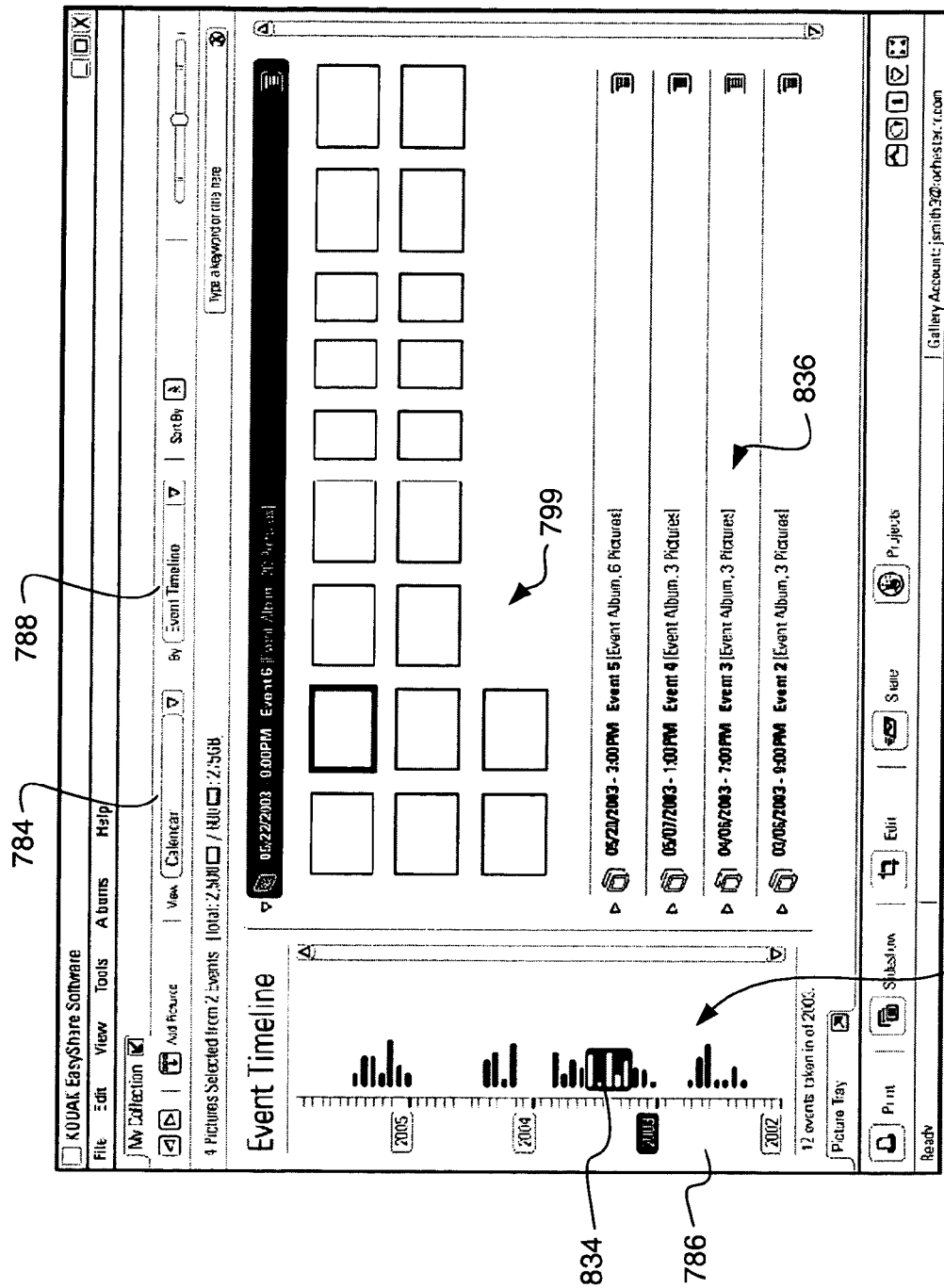
FIG. 20 shows another example of a display presenting a first selection set, a second selection set, a result screen and digital multimedia object content.

It will be appreciated that the methods described with reference to FIGS. 7-19 can also be practiced using other systems, including system 10 of FIG. 1. FIG. 20 shows one example of this wherein video display device 52 presents an indication 784 of a selected one of a first set of organizational metaphors in a pull down menu area of a type known in the art. Similarly, the video display device 52 presents an indication 788 of a selected one of a second set of organizational metaphors while a result screen 786 presents an event histogram of group icons 790. It will be appreciated that in FIG. 20, group icons 790 are shown that are selected in a collection of more than one so as to cause image content 799 from digital multimedia objects associated with a selected one of the group icons 790 to be presented.

As is also shown in FIG. 20, a limited set selection capability is provided that allows a user to use, for example, mouse 44 and/or keyboard 46 to select a plurality of group icons, as shown by set marker 834 shown in FIG. 20. Where this capability is used, image content 799 from a selected group is presented in one area of display 730 and information 836 is present concurrently in other portions of display 730. This allows a user to both observe the image content from a selected group icons while also being able to review information 836 about the digital multimedia objects of the other selected group icons. Information 836 can comprise textual information as shown or it can comprise graphical information or image content from the image content associated with digital multimedia objects of the group icons.

A computer program product for practicing the invention can include one or more storage medium, for example; magnetic storage media such as magnetic disk (such as a floppy disk) or magnetic tape; optical storage media such as optical disk, optical tape, or machine-readable bar code; solid-state electronic storage devices such as random access memory (RAM), or read-only memory (ROM); or any other physical device or media employed to store a computer program having instructions for practicing a method according to the present invention.

The invention has been described in detail with particular reference to certain preferred embodiments thereof, but it will be understood that variations and modifications can be effected within the spirit and scope of the invention.

PARTS LIST

| | |
|---|---|
| 6 | digital camera |
| 10 | home computer |
| 12 | data bus |
| 14 | CPU |
| 16 | read-only memory |
| 18 | network connection device |
| 20 | hard disk drive |
| 22 | random access memory |
| 24 | display interface device |
| 26 | audio interface device |
| 28 | desktop interface device |
| 30 | CD-R/W drive |
| 32 | floppy disk drive |
| 34 | USB interface device |
| 40 | floppy disk |
| 42 | CD-RW writable media |
| 44 | mouse |
| 46 | keyboard |
| 48 | microphone |
| 50 | speaker |
| 52 | video display device |
| 60 | network |
| 80 | graphical bar |
| 82 | timeline scale |
| 84 | timeline scale |
| 100 | block |
| 102 | block |
| 104 | block |
| 106 | block |
| 108 | block |
| 110 | block |
| 112 | block |
| 114 | block |
| 130 | block |
| 132 | block |
| 134 | block |
| 136 | block |
| 138 | block |
| 142 | block |
| 144 | block |
| 146 | block |
| 148 | block |
| 210 | block |
| 212 | block |
| 214 | block |
| 230 | block |
| 232 | block |
| 234 | block |
| 236 | block |
| 238 | block |
| 240 | block |
| 600 | timeline location |
| 602 | viewable area |
| 604 | timeline scale |
| 606 | timeline scale |
| 610 | pointer |
| 710 | system |
| 720 | body |
| 722 | image capture system |
| 723 | lens system |
| 724 | image sensor |
| 725 | lens driver |
| 726 | signal processor |
| 727 | rangefinder |
| 728 | display driver |
| 730 | display |
| 732 | controller |
| 734 | user input system |
| 736 | sensor |
| 740 | memory |
| 746 | memory card slot |
| 748 | removable memory |

-continued

| | |
|---|---|
| 750 | removable memory interface |
| 752 | remote memory |
| 754 | communication module |
| 760 | capture button |
| 762 | tele-zoom button |
| 764 | wide-angle zoom button |
| 765 | select button |
| 766 | joystick |
| 767 | mode selector |
| 768 | 5-way control |
| 769 | keypad |
| 770 | audio capture unit |
| 772 | microphone |
| 774 | audio processing circuit |
| 776 | speaker |
| 780 | first selection set |
| 782 | second selection set |
| 784 | indication |
| 786 | result screen |
| 788 | indication |
| 790 | group icon |
| 792 | group icon |
| 794 | group icon |
| 798 | presented image |
| 799 | image content |
| 800 | receive collection access step |
| 802 | present first selection set step |
| 804 | receiver first selection step |
| 806 | present second selection set step |
| 808 | receive second selection step |
| 810 | present result screen with group icons step |
| 812 | receive selection step |
| 814 | present content step |
| 830 | sub-result screen |
| 832 | sub-group icon |
| 834 | set marker |
| 836 | information |

The invention claimed is:

1. A method for operating a display associated with a user interface and a collection of digital multimedia objects, the method comprising the steps of:
presenting through a user interface a first selection set of predefined organizational metaphors representing selection criteria to be applied to the collection of digital multimedia objects;
receiving through the user interface a selection of a former first organizational metaphor from the first selection set of predefined organizational metaphors;
determining a former second selection set of the predefined organizational metaphors not provided to the user with the first selection set after receiving the selection of the former first organizational metaphor, the former second selection set being determined based upon the former first selected organizational metaphor and representing additional selection criteria to be applied to the collection of digital multimedia objects;
presenting through the user interface the determined former second selection set of predefined organizational metaphors;
receiving through the user interface a selection of a former second organizational metaphor from the former second selection set of predefined organizational metaphors;
selecting first and second groups of digital multimedia objects from the collection of digital multimedia objects using result presentation rules based at least in part upon at least one of the selected organizational metaphors, each group including a plurality of digital multimedia objects, wherein the digital multimedia objects in each group are chosen from the collection according to the selection criteria associated with the former selected first and second organizational metaphors and the content of the digital multimedia objects or any metadata associated with the digital multimedia objects;
providing first and second group icons indicating the first and second selected groups, respectively;
presenting on the display at least one of the group icons;
receiving through the user interface a selection of one of the presented group icons; and
displaying one or more of the plurality of digital multimedia objects associated with the selected group icon;
wherein at least one of the digital multimedia objects is in either the first or second selected group associated with the former selected first and second organizational metaphor, and in either the first or second selected group associated with a latter, different selected first and second organizational metaphor.

2. The method of claim 1, wherein the indication of the former first selected organizational metaphor, and an indication of the former second selected organizational metaphor and one of the group icons are presented on separate portions of the display at the same time.

3. The method of claim 1, wherein the digital multimedia objects include still images, graphics, text, video images, sequences of images, streams of large information, and associated audio.

4. The method of claim 1, wherein the organizational metaphors are selected from the group consisting of a geographic metaphor, an image subject metaphor, a person metaphor, or an image content metaphor.

5. The method of claim 1, wherein the group icons are activatable to cause the presentation of image content from at least one of the digital multimedia objects in the image group.

6. The method of claim 5, wherein the presentation of image content comprises a display of thumbnail representation(s) of image content from each digital multimedia object, and wherein each thumbnail is activatable to cause presentation of the image content depicted by the thumbnail on a scale that is larger than the scale of the image content on the thumbnail.

7. The method of claim 1, further comprising the step of presenting a histogram timeline representing a number of events in response to a selection of at least one of the organizational metaphors including an event metaphor.

8. The method of claim 7, wherein the graphical representation of the second organizational metaphor comprises a timeline having one axis representing a chronological continuum with event icons presented in chronological order thereon.

9. The method of claim 1, wherein a group icon is activatable to cause the presentation of at least two sub-group icons, each sub-group icon indicating at least a portion of the digital multimedia objects indicated by the group icon.

10. The method of claim 1, wherein the second selection set of the predefined organizational metaphors is further determined based upon the image content of one or more of the digital multimedia objects.

11. The method of claim 1, wherein the first and second selection sets of organizational metaphors do not include hierarchical file structures.

12. The method of claim 1, wherein the organizational metaphor is an event metaphor.

13. A method for presenting a set of digital multimedia objects in an organized manner on a portable display screen, the method comprising;
receiving through a user interface a selection of a first organizational metaphor from a presented set of predefined organizational metaphors representing selection criteria to be applied to a collection of digital multimedia objects;

determining an additional set of the predefined organizational metaphors not provided to the user with the first selection set after receiving the selection of the former first organizational metaphor, the second selection set being determined based upon the former first selected organizational metaphor and representing additional selection criteria to be applied to the collection of digital multimedia objects;

displaying the additional set of predefined organizational metaphors;

receiving through the user interface a selection of a second organizational metaphor from the additional set;

displaying an indicator of at least the selected first organizational metaphor in conjunction with the additional presented set of predefined organizational metaphors;

selecting a number of the digital multimedia objects from the collection of digital multimedia objects according to the selection criteria associated with the selected organizational metaphors and the content of the digital multimedia objects or any metadata associated with the digital multimedia objects;

organizing the selected digital multimedia objects into at least two groups according to result presentation rules based at least in part upon at least one of the selected organizational metaphors and including at least rules for selecting digital multimedia objects from the collection of digital multimedia objects, rules for selecting a number of groups, and rules for associating digital multimedia objects with particular iconic representations, wherein each group includes a plurality of the digital multimedia objects; and providing respective iconic representations of the groups;

wherein at least one of the selected digital multimedia objects is in at least two of the groups.

14. The method of claim 13, further comprising the steps of sensing a selection of one of the iconic representations; and presenting at least one image that is based upon the image content that is associated with at least one of the digital multimedia objects in the selected iconic representation.

15. A visual image display device, comprising:
a visual display;
a source of digital multimedia objects;
a user input device adapted to receive an input from a user; and
a processing unit operatively connected to the display, the source of digital multimedia objects, and the user input device, said processing unit being adapted to:
cause the visual display to present a first selection set of predefined organizational metaphors representing selection criteria to be applied to the collection of digital multimedia objects, to receive a former selection of one of the first selection set organizational metaphors from the user input device,
determine a second selection set of predefined organizational metaphors after the user selection of the former first organizational metaphor and dependent upon the first selected organizational metaphor to cause the visual display to present the second selection set of predefined organizational metaphors not presented with the first selection set and representing additional selection criteria to be applied to the collection of digital multimedia objects and to receive a former selection of one of the second set of predefined organizational metaphors;
cause a result to be presented on the display, with the result having one of at least two group icons, each group icon indicating a respective group containing a plurality of digital multimedia objects selected from the collection according to the selection criteria associated with the former selected organizational metaphors and the content of the digital multimedia objects or metadata associated with the digital multimedia objects; and
receive a selection of one of the presented group icons from the user input device and to cause one or more of the plurality of digital multimedia objects associated with the selected group icon to be presented on the display;
wherein the group of digital multimedia objects indicated by each group icon is selected according to result presentation rules based at least in part upon at least one of the selected organizational metaphors, and
wherein at least one of the digital multimedia objects is indicated in a first group icon associated with the former selected first and second organizational metaphor, and in a second group icon associated with a latter, different selected first and second organizational metaphor.

16. The image display device of claim 15, wherein the result presentation rules include rules for selecting digital multimedia objects from the set of digital multimedia objects, rules for selecting the number of the groups, and rules for associating digital multimedia objects with particular group icons.

17. The image display device of claim 15, wherein at least one of the selected organizational metaphors includes an event metaphor causing the display of a histogram timeline of group icons.

18. The image display device of claim 15, wherein the source of digital multimedia objects includes a device on which computer-readable data can be read or written, a magnetic disk, a magnetic tape, an optical disk, a semiconductor memory, or a communication circuit adapted to exchange data files with an image server that is separated from the image display device.

19. The image display device of claim 15, wherein at least one of the group icons and image content is presented with simulated depth dimensionality.

20. The image display device of claim 15, wherein the user interface and processing unit are adapted and enable the user to select a limited set of more than one group icon and to present information related to the digital multimedia objects of each group icon.

* * * * *